United States Patent
Xu et al.

(10) Patent No.: US 12,166,668 B2
(45) Date of Patent: Dec. 10, 2024

(54) PATH FAULT DETECTION METHOD AND APPARATUS, RELATED DEVICE, AND STORAGE MEDIUM

(71) Applicant: Huawei Technologies Co., Ltd., Shenzhen (CN)

(72) Inventors: Hongxia Xu, Beijing (CN); Zheng Chen, Beijing (CN); Jie Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/337,758

(22) Filed: Jun. 20, 2023

(65) Prior Publication Data

US 2023/0336463 A1  Oct. 19, 2023

Related U.S. Application Data

(63) Continuation of application No. PCT/CN2021/139213, filed on Dec. 17, 2021.

(30) Foreign Application Priority Data

Dec. 21, 2020 (CN) .......................... 202011519969.1
Mar. 31, 2021 (CN) .......................... 202110352006.5

(51) Int. Cl.
*H04L 45/28* (2022.01)
*H04L 45/00* (2022.01)

(52) U.S. Cl.
CPC ............. *H04L 45/28* (2013.01); *H04L 45/20* (2013.01); *H04L 45/566* (2013.01)

(58) Field of Classification Search
CPC ........ H04L 45/28; H04L 45/20; H04L 45/566
See application file for complete search history.

(56) References Cited

U.S. PATENT DOCUMENTS 7,463,591 B1 * 12/2008 Kompella ........... H04L 43/0811
370/248
7,940,695 B1 * 5/2011 Bahadur ................. H04L 47/10
370/254

(Continued)

FOREIGN PATENT DOCUMENTS

CN 102624609 A 8/2012
CN 108768788 A 11/2018

(Continued)

OTHER PUBLICATIONS

Pignataro, C. et al., "Seamless Bidirectional Forwarding Detection (S-BFD)," Internet Engineering Task Force (IETF), Request for Comments: 7880, Updates: 5880, Category: Standards Track, ISSN: 2070-1721, Jul. 2016, 24 pages.

*Primary Examiner* — David R Lazaro
(74) *Attorney, Agent, or Firm* — Slater Matsil, LLP

(57) ABSTRACT

Embodiments of this application disclose a path fault detection method and apparatus, a related device, and a storage medium, and belong to the field of communication technologies. In embodiments of this application, a return path is determined according to a forward path. In a path fault detection process, the return path through which a fault detection packet fed back by a tail node to a head node passes includes the forward path. In this way, if the head node receives the fault detection packet fed back by the tail node, it indicates that the forward path is not faulty.

20 Claims, 8 Drawing Sheets

(56) References Cited

U.S. PATENT DOCUMENTS

| | | | | |
|---|---|---|---|---|
| 7,983,174 B1* | 7/2011 | Monaghan | H04L 45/50 |
| | | | 370/242 |
| 10,547,500 B1* | 1/2020 | Hardman | H04L 43/10 |
| 10,567,295 B2* | 2/2020 | Barton | H04L 43/0852 |
| 10,868,755 B2* | 12/2020 | Filsfils | H04L 45/74 |
| 11,165,695 B1* | 11/2021 | P | H04L 45/28 |
| 11,552,879 B1* | 1/2023 | Sivabalan | H04L 43/0811 |
| 2011/0038380 A1* | 2/2011 | Li | H04L 12/4633 |
| | | | 370/401 |
| 2011/0310727 A1* | 12/2011 | Guo | H04L 41/0631 |
| | | | 370/216 |
| 2012/0281524 A1* | 11/2012 | Farkas | H04L 45/66 |
| | | | 370/242 |
| 2015/0381324 A1* | 12/2015 | Mirsky | H04L 45/00 |
| | | | 370/241.1 |
| 2019/0356600 A1* | 11/2019 | Barton | H04L 43/0852 |
| 2021/0367867 A1* | 11/2021 | Arora | H04L 45/50 |
| 2023/0141362 A1* | 5/2023 | Mittal | H04L 45/34 |
| | | | 370/389 |
| 2023/0198891 A1* | 6/2023 | Zhou | H04L 45/124 |
| | | | 370/389 |
| 2023/0318970 A1* | 10/2023 | Yang | H04L 45/741 |
| 2023/0318971 A1* | 10/2023 | Li | H04L 45/566 |
| | | | 709/238 |
| 2023/0336463 A1* | 10/2023 | Xu | H04L 43/0811 |

FOREIGN PATENT DOCUMENTS

| | | |
|---|---|---|
| CN | 111682982 A | 9/2020 |
| WO | 2017202121 A1 | 11/2017 |
| WO | 2019184895 A1 | 10/2019 |

\* cited by examiner

PATH FAULT DETECTION METHOD AND APPARATUS, RELATED DEVICE, AND STORAGE MEDIUM

CROSS-REFERENCE TO RELATED APPLICATIONS

This application is a continuation of International Application No. PCT/CN2021/139213, filed on Dec. 17, 2021, which claims priority to Chinese Patent Application No. 202011519969.1, filed on Dec. 21, 2020 and Chinese Patent Application No. 202110352006.5, filed on Mar. 31, 2021. All of the aforementioned patent applications are hereby incorporated by reference in their entireties.

TECHNICAL FIELD

Embodiments of this application relate to the field of communication technologies, and in particular, to a path fault detection method and apparatus, a related device, and a storage medium.

BACKGROUND

To ensure communication quality, fault detection needs to be performed on a communication path between network devices. For example, after a communication tunnel is established between a head node and a tail node, fault detection needs to be performed on a path in the communication tunnel, so as to ensure communication quality of the communication tunnel.

In a related technology, a path fault is detected by periodically sending a fault detection packet between the head node and the tail node, for example, a bidirectional forwarding detection (BFD) packet or a seamless bidirectional forwarding detection (seamless BFD, S-BFD) packet. Sending a BFD packet is used as an example. The head node sends the BFD packet to the tail node through a forward path, and the tail node feeds back the BFD packet to the head node through a return path. If the head node does not receive the BFD packet fed back by the tail node, the head node determines that the forward path is faulty. The forward path is a path computed in a process of creating a tunnel between the head node and the tail node. One or more links over which the BFD packet sent by the head node to the tail node through the tunnel passes constitute a link in the forward path. The return path is determined through manual configuration, or is instantly computed by using a shortest path algorithm, that is, the path is automatically selected by a network device, and path configuration is not supported.

However, both the manually configured return path and the instantly computed return path may be inappropriate. If the return path is inappropriate, false detection is caused. In a scenario of switching between active and standby forward paths, false detection may easily cause false switching, and false switching affects communication quality, thereby affecting a communication service. For example, in the scenario of switching between active and standby forward paths, the active forward path used by the head node to send the fault detection packet includes a link 1 but does not include a link 2, and the return path used by the tail node to feed back the fault detection packet is manually configured as including the link 2 but not including the link 1. Assuming that the link 2 is faulty but the link 1 is not faulty, after sending the fault detection packet through the active forward path, the head node does not receive a feedback from the tail node and incorrectly considers that the forward path is faulty, and the head node incorrectly switches to the standby forward path due to false detection, thereby affecting communication quality.

SUMMARY

Embodiments of this application provide a path fault detection method and apparatus, a related device, and a storage medium, so that false detection can be avoided in path fault detection, thereby avoiding false switching caused by false detection, mitigating impact on a communication service, and improving communication quality. Technical solutions are as follows:

According to a first aspect, a path fault detection method is provided. The method is applied to a head node, and the method includes:

The head node sends a first fault detection packet to a tail node through a forward path, where the first fault detection packet indicates that a return path exists, the return path includes the forward path, and the return path is determined according to the forward path. If a second fault detection packet sent by the tail node through the return path is received, the head node determines that the forward path is not faulty. The return path includes the forward path, and the second fault detection packet is determined according to the first fault detection packet.

In this embodiment of this application, in a path fault detection process, the return path through which the fault detection packet fed back by the tail node to the head node passes includes the forward path. In this way, if the head node receives the fault detection packet fed back by the tail node, it indicates that the forward path is not faulty. It can be learned that, in this solution, the return path covers the forward path, so that false detection can be avoided, thereby avoiding false switching caused by false detection, and mitigating impact on a communication service. That is, the return path determined according to the forward path in this solution is more appropriate.

Optionally, after the head node sends the first fault detection packet to the tail node through the forward path, the method further includes: If the second fault detection packet is not received, the head node determines that the forward path is faulty.

Optionally, in this embodiment of this application, the return path is determined by the head node, that is, the head node plans the return path. In an implementation, before the head node sends the first fault detection packet to the tail node through the forward path, the method further includes: The head node determines the return path according to hop-by-hop information of the forward path.

Optionally, the hop-by-hop information includes link information and/or node information. That is, in this embodiment of this application, a path may be represented by a link and/or nodes. When a path is represented by nodes, hop-by-hop may be loose or strict. When a path is represented by a link, hop-by-hop is strict.

Optionally, a link in the return path is consistent with a link in the forward path. In this way, consistency of the forward path and the return path can be strictly ensured. This avoids false detection, and improves accuracy of path fault detection.

Optionally, in this embodiment of this application, the return path may alternatively be determined by a control device according to the forward path, and the control device delivers hop-by-hop information of the return path to the head node. Optionally, in this embodiment of this application, after the head node determines the return path, or after the head node receives the hop-by-hop information of the return path that is delivered by the control device, the head node notifies the tail node of the return path. In an implementation, before the head node sends the first fault detection packet to the tail node through the forward path, the method further includes: The head node sends a first path notification packet to the tail node, where the first path notification packet carries hop-by-hop information of the return path. It should be noted that, in this way, the tail node does not need to have a path computation capability, and therefore dependency on a capability of the tail node is relatively low.

Optionally, the first path notification packet is used by the tail node to generate a path binding relationship between the hop-by-hop information of the return path and a path identifier. That is, the return path further corresponds to the path identifier.

Optionally, after the head node sends the first path notification packet to the tail node, the method further includes: The head node receives a first response packet sent by the tail node, where the first response packet carries the path identifier. Correspondingly, before the head node sends the first fault detection packet to the tail node through the forward path, the method further includes: The head node generates the first fault detection packet, where the first fault detection packet carries the path identifier, and the first fault detection packet indicates the tail node to determine, from the path binding relationship, the hop-by-hop information of the return path that corresponds to the path identifier; and generates the second fault detection packet in which the hop-by-hop information of the return path is encapsulated.

To be specific, considering that there is more than one tunnel related to the head node, there is also more than one forward path related to the head node. If more than one forward path corresponds to a return path, each return path needs a corresponding path identifier. In this way, the head node sends, to the tail node, the first fault detection packet that carries the path identifier, and the tail node can find a corresponding return path according to the path identifier, and encapsulate hop-by-hop information of the return path into the second fault detection packet, so that the second fault detection packet is forwarded according to the return path.

Optionally, the path identifier is a binding segment identifier (BSID).

Optionally, in this embodiment of this application, it is assumed that the return path is determined by the head node, or is determined by the tail node and then notified to the head node, or is determined by a control device hosting a tunnel between the head node and the tail node and then delivered to the head node, that is, the head node stores hop-by-hop information of the return path. In this case, before the head node sends the first fault detection packet to the tail node through the forward path, the method further includes: generating the first fault detection packet, where the first fault detection packet carries the hop-by-hop information of the return path, where the first fault detection packet indicates the tail node to use the first fault detection packet as the second fault detection packet, and forward the second fault detection packet according to the return path.

When the return path is determined by the head node, or is determined by the control device and then delivered to the head node, the tail node does not need to have a path computation capability, but only needs to support a basic routing function and complete forwarding of the fault detection packet. The tail node does not sense a unidirectional tunnel status of the head node or a status of the fault detection packet, and therefore dependency on a capability of the tail node is low.

Optionally, the forward path includes a plurality of load sharing paths, any load sharing path is used to bear a part or all of a load between the head node and the tail node, and the return path includes the plurality of load sharing paths. That is, in a load sharing scenario, the return path covers all load sharing paths. In this way, if a path on any active path in load sharing fails, the head node instantly senses the fault, and switches all services to a standby path. In this way, the path fault is instantly sensed, and the services are switched in time, thereby shortening a transient service impact time, and preventing continuous service impact.

Optionally, the return path meets a specified condition, and the specified condition includes one or more of a lowest cost, a maximum bandwidth, and a minimum hop count. That is, planning of the return path not only needs to consider that the forward path is included, but also needs to meet one or more conditions of a lowest cost, a maximum bandwidth, and a minimum hop count.

Optionally, after the head node determines that the forward path is faulty, the method further includes: The head node re-determines a forward path. The head node updates the return path according to hop-by-hop information of the re-determined forward path. That is, the head node has a function of automatically updating a path, and the head node re-plans a forward path and a return path. In this way, when a second fault occurs, the head node can quickly sense the fault, and quickly perform switching, thereby mitigating impact on a communication service.

It should be noted that, in this solution, the return path is determined by the head node, the tail node, or the control device, and does not need to be manually configured. This improves fault detection efficiency, and can avoid a case in which a communication service is affected because manual configuration cannot be performed in time after a path fault occurs. In addition, the return path determined in this solution does not consider only a shortest path, but considers that the return path needs to include the forward path. That is, the return path in this solution is more appropriate.

According to a second aspect, a path fault detection method is provided. The method is applied to a tail node, and the method includes:

The tail node receives a first fault detection packet sent by a head node through a forward path, where the first fault detection packet indicates that a return path exists, the return path includes the forward path, and the return path is determined according to the forward path. The tail node sends a second fault detection packet through the return path, where the second fault detection packet is determined according to the first fault detection packet.

In this embodiment of this application, the return path is determined according to the forward path. In a path fault detection process, the return path through which the fault detection packet fed back by the tail node to the head node passes includes the forward path. In this way, if the head node receives the fault detection packet fed back by the tail node, it indicates that the forward path is not faulty. It can be learned that, in this solution, the return path covers the forward path, so that false detection can be avoided, thereby avoiding false switching caused by false detection, and mitigating impact on a communication service. That is, the return path determined according to the forward path in this solution is more appropriate.

Optionally, the return path corresponds to a path identifier, the tail node stores a path binding relationship between hop-by-hop information of the return path and the path identifier, and the first fault detection packet carries the path identifier. Before the tail node sends the second fault detection packet through the return path, the method further includes: The tail node determines, from the path binding relationship, the hop-by-hop information of the return path that corresponds to the path identifier carried in the first fault detection packet. The tail node generates the second fault detection packet, where the second fault detection packet carries the hop-by-hop information of the return path.

To be specific, considering that there is more than one tunnel related to the head node, there is also more than one forward path related to the head node. If more than one forward path corresponds to a return path, each return path needs a corresponding path identifier. In this way, the head node sends, to the tail node, the first fault detection packet that carries the path identifier, and the tail node can find a corresponding return path according to the path identifier, and encapsulate hop-by-hop information of the return path into the second fault detection packet, so that the second fault detection packet is forwarded according to the return path.

Optionally, the first fault detection packet carries hop-by-hop information of the return path. That the tail node sends a second fault detection packet through the return path includes: The tail node uses the first fault detection packet as the second fault detection packet, and forwards the second fault detection packet according to the return path. That is, the head node directly encapsulates the return path into the first fault detection packet, and the tail node forwards the first fault detection packet after receiving the first fault detection packet.

Optionally, in this embodiment of this application, the return path is determined by the tail node, that is, the tail node plans the return path. In an implementation, before the tail node sends the second fault detection packet through the return path, the method further includes: The tail node obtains hop-by-hop information of the forward path. The tail node determines the return path according to the hop-by-hop information of the forward path.

Optionally, that the tail node obtains hop-by-hop information of the forward path includes: The tail node receives a path computation request packet sent by the head node, where the path computation request packet carries the hop-by-hop information of the forward path. The tail node parses the path computation request packet to obtain the hop-by-hop information of the forward path. That is, the head node notifies the tail node of the forward path, so as to request the tail node to compute the corresponding return path. In this way, path computation pressure of the head node can be reduced.

It should be noted that, in this solution, the return path may be determined by the tail node, the head node, or a control device, and does not need to be manually configured. This improves fault detection efficiency, and can avoid a case in which a communication service is affected because manual configuration cannot be performed in time after a path fault occurs. In addition, the return path determined in this solution does not consider only a shortest path, but considers that the return path needs to include the forward path. That is, the return path in this solution is more appropriate.

According to a third aspect, a path fault detection method is provided. The method is applied to a control device, and the method includes:

The control device determines hop-by-hop information of a forward path. The control device determines a return path according to the hop-by-hop information of the forward path, where the return path includes the forward path. The control device delivers a second path notification packet to a head node and/or a tail node, where the second path notification packet carries hop-by-hop information of the return path. Subsequently, a fault detection packet can be sent between the head node and the tail node according to the forward path and the return path, so as to implement fault detection on the forward path.

In this embodiment of this application, the control device determines the return path according to the forward path, so as to reduce computing pressure of the head node and the tail node, and reduce function dependency on the head node and the tail node. In a subsequent path fault detection process, the return path through which the fault detection packet fed back by the tail node to the head node passes includes the forward path. In this way, if the head node receives the fault detection packet fed back by the tail node, it indicates that the forward path is not faulty. It can be learned that, in this solution, the return path covers the forward path, so that false detection can be avoided, thereby avoiding false switching caused by false detection, and mitigating impact on a communication service. That is, the return path in this solution is more appropriate.

In addition, in this solution, the control device automatically performs path computation, and manual configuration is not required. This improves fault detection efficiency, and can avoid a case in which a communication service is affected because manual configuration cannot be performed in time after a path fault occurs. In addition, the return path determined in this solution does not consider only a shortest path, but considers that the return path needs to include the forward path. That is, the return path in this solution is more appropriate.

Optionally, before the control device determines the hop-by-hop information of the forward path, the method further includes: The control device receives a path request packet sent by the head node or the tail node, where the path request packet carries path indication information. That the control device determines hop-by-hop information of a forward path includes: The control device determines the hop-by-hop information of the forward path from stored hop-by-hop information of one or more paths according to the path indication information carried in the path request packet. That is, in this solution, the head node or the tail node may request the control device to perform path computation.

Optionally, the path indication information includes a request number, and the request number uniquely identifies a path.

Optionally, the path request packet further carries algorithm information, and the algorithm information indicates the control device to determine the return path according to a specified algorithm. That is, the head node or the tail node can further specify an algorithm as required, and request the control device to perform path computation according to the specified algorithm.

According to a fourth aspect, a path fault detection apparatus is provided. The path fault detection apparatus has a function of implementing behavior of the path fault detection method in the first aspect. The path fault detection apparatus includes one or more modules, and the one or more modules are configured to implement the path fault detection method provided in the first aspect.

That is, a path fault detection apparatus is provided. The apparatus is applied to a head node, and the apparatus includes:

a first sending module, configured to send a first fault detection packet to a tail node through a forward path, where the first fault detection packet indicates that a return path exists, the return path includes the forward path, and the return path is determined according to the forward path; and a first determining module, configured to: if a second fault detection packet sent by the tail node through the return path is received, determine that the forward path is not faulty, where the second fault detection packet is determined according to the first fault detection packet.

Optionally, the apparatus further includes:

a second determining module, configured to: if the second fault detection packet is not received, determine that the forward path is faulty.

Optionally, the apparatus further includes:

a third determining module, configured to determine the return path according to hop-by-hop information of the forward path.

Optionally, the hop-by-hop information includes link information and/or node information.

Optionally, the apparatus further includes:

a second sending module, configured to send a first path notification packet to the tail node, where the first path notification packet carries hop-by-hop information of the return path.

Optionally, the first path notification packet is used by the tail node to generate a path binding relationship between the hop-by-hop information of the return path and a path identifier.

Optionally, the apparatus further includes:

a receiving module, configured to receive a first response packet sent by the tail node, where the first response packet carries the path identifier; and the apparatus further includes:

a first generation module, configured to: generate the first fault detection packet, where the first fault detection packet carries the path identifier, and the first fault detection packet indicates the tail node to determine, from the path binding relationship, the hop-by-hop information of the return path that corresponds to the path identifier; and generate the second fault detection packet in which the hop-by-hop information of the return path is encapsulated.

Optionally, the path identifier is a binding segment identifier BSID.

Optionally, the apparatus further includes:

a second generation module, configured to generate the first fault detection packet, where the first fault detection packet carries hop-by-hop information of the return path, and the first fault detection packet indicates the tail node to use the first fault detection packet as the second fault detection packet, and forward the second fault detection packet according to the return path.

Optionally, the forward path includes a plurality of load sharing paths, any load sharing path is used to bear a part or all of a load between the head node and the tail node, and the return path includes the plurality of load sharing paths.

Optionally, the return path meets a specified condition, and the specified condition includes one or more of a lowest cost, a maximum bandwidth, and a minimum hop count.

Optionally, the apparatus further includes:

a first updating module, configured to re-determine a forward path; and a second updating module, configured to update the return path according to the re-determined forward path.

Optionally, a link in the return path is consistent with a link in the forward path.

According to a fifth aspect, a path fault detection apparatus is provided. The path fault detection apparatus has a function of implementing behavior of the path fault detection method in the second aspect. The path fault detection apparatus includes one or more modules, and the one or more modules are configured to implement the path fault detection method provided in the second aspect.

That is, a path fault detection apparatus is provided. The apparatus is applied to a tail node, and the apparatus includes:

a first receiving module, configured to receive a first fault detection packet sent by a head node through a forward path, where the first fault detection packet indicates that a return path exists, the return path includes the forward path, and the return path is determined according to the forward path; and a sending module, configured to send a second fault detection packet through the return path, where the second fault detection packet is determined according to the first fault detection packet.

Optionally, the return path corresponds to a path identifier, the tail node stores a path binding relationship between hop-by-hop information of the return path and the path identifier, and the first fault detection packet carries the path identifier; and the apparatus further includes:

a first determining module, configured to determine, from the path binding relationship, the hop-by-hop information of the return path that corresponds to the path identifier carried in the first fault detection packet; and a generation module, configured to generate the second fault detection packet, where the second fault detection packet carries the hop-by-hop information of the return path.

Optionally, the first fault detection packet carries hop-by-hop information of the return path; and the sending module includes:

a forwarding submodule, configured to: use the first fault detection packet as the second fault detection packet, and forward the second fault detection packet according to the return path.

Optionally, the apparatus further includes:

a second receiving module, configured to receive a path computation request packet sent by the head node, where the path computation request packet carries hop-by-hop information of the forward path; and a second determining module, configured to determine the return path according to the hop-by-hop information of the forward path.

According to a sixth aspect, a path fault detection apparatus is provided. The path fault detection apparatus has a function of implementing behavior of the path fault detection method in the third aspect. The path fault detection apparatus includes one or more modules, and the one or more modules are configured to implement the path fault detection method provided in the third aspect.

That is, a path fault detection apparatus is provided. The apparatus is applied to a control device, and the apparatus includes:

a first determining module, configured to determine hop-by-hop information of a forward path;

a second determining module, configured to determine a return path according to the hop-by-hop information of the forward path, where the return path includes the forward path; and a sending module, configured to deliver a second path notification packet to a head node and/or a tail node, where the second path notification packet carries hop-by-hop information of the return path.

Optionally, the apparatus further includes:

a receiving module, configured to receive a path request packet sent by the head node or the tail node, where the path request packet carries path indication information; and the first determining module includes:

a determining submodule, configured to determine the hop-by-hop information of the forward path from stored hop-by-hop information of one or more paths according to the path indication information carried in the path request packet.

Optionally, the path indication information includes a request number, and the request number uniquely identifies a path.

Optionally, the path request packet further carries algorithm information, and the algorithm information indicates the control device to determine the return path according to a specified algorithm.

According to a seventh aspect, a communication device is provided. The communication device includes a processor and a memory. The memory is configured to: store a program that supports the communication device in performing the path fault detection method provided in the first aspect, the second aspect, or the third aspect; and store data used for implementing the path fault detection method provided in the first aspect, the second aspect, or the third aspect. The processor is configured to execute the program stored in the memory. The communication device may further include a communication bus, and the communication bus is configured to establish a connection between the processor and the memory.

According to an eighth aspect, a computer-readable storage medium is provided. The computer-readable storage medium stores a computer program, and when the computer program is run on a computer, the computer is enabled to perform the path fault detection method in the first aspect, the second aspect, or the third aspect.

According to a ninth aspect, a computer program product including instructions is provided. When the computer program product is run on a computer, the computer is enabled to perform the path fault detection method in the first aspect.

Technical effects achieved in the fourth aspect are similar to the technical effects achieved in the corresponding technical means in the first aspect, technical effects achieved in the fifth aspect are similar to the technical effects achieved in the corresponding technical means in the second aspect, technical effects achieved in the sixth aspect are similar to the technical effects achieved in the corresponding technical means in the third aspect, and technical effects achieved in the seventh aspect, the eighth aspect, and the ninth aspect are similar to the technical effects achieved in the corresponding technical means in the first aspect, the second aspect, or the third aspect. Details are not described herein again.

Beneficial effects brought by the technical solutions provided in embodiments of this application include at least the following technical effects:

In embodiments of this application, the return path is determined according to the forward path. In a path fault detection process, the return path through which the fault detection packet fed back by the tail node to the head node passes includes the forward path. In this way, if the head node receives the fault detection packet fed back by the tail node, it indicates that the forward path is not faulty. It can be learned that, in the solutions, the return path covers the forward path, so that false detection can be avoided, thereby avoiding false switching caused by false detection, and mitigating impact on a communication service. That is, the return path determined according to the forward path in the solutions is more appropriate.

DETAILED DESCRIPTION OF ILLUSTRATIVE EMBODIMENTS

To make objectives, technical solutions, and advantages of embodiments of this application clearer, the following further describes implementations of this application in detail with reference to the accompanying drawings.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

Figure 1:
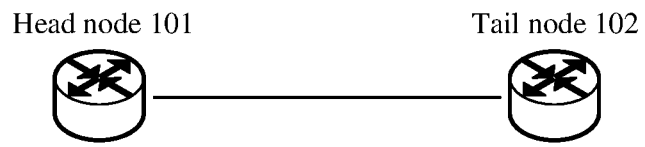
FIG. 1 is an architectural diagram of a system related to a path fault detection method according to an embodiment of this application.

FIG. 1 is an architectural diagram of a system related to a path fault detection method according to an embodiment of this application. Refer to FIG. 1. The system includes a head node 101 and a tail node 102. The head node 101 and the tail node 102 communicate with each other by creating one or more tunnels. A protocol for creating a tunnel includes but is not limited to the segment routing (SR), the label distribution protocol (LDP), the resource reservation protocol-traffic engineering (RSVP-TE), the segment routing-traffic engineering (SR-TE), the segment routing-best effort (SR-BE), the segment routing policy (SR Policy), the segment routing version 6 policy (SRv6 Policy), and the like. That is, this solution can be applied to path fault detection in various scenarios.

In this embodiment of this application, the head node 101 is configured to send a first fault detection packet to the tail node 102 through a forward path, and the tail node 102 is configured to send a second fault detection packet to the head node 101 through a return path. The head node 101 is further configured to: if the second fault detection packet is received, determine that the forward path is not faulty. Optionally, the head node 101 is further configured to: if the second fault detection packet is not received, determine that the forward path is faulty. The forward path is a path computed in a process of creating a tunnel between the head node 101 and the tail node 102. One or more links through which a fault detection packet sent by the head node through the tunnel passes constitute a link in the forward path. The return path includes the forward path, that is, the return path covers the forward path. Optionally, a link in the return path is consistent with a link in the forward path.

It should be noted that, in this embodiment of this application, the forward path and the return path are directional, and a link in the return path includes a reverse link of a link in the forward path.

Figure 2:
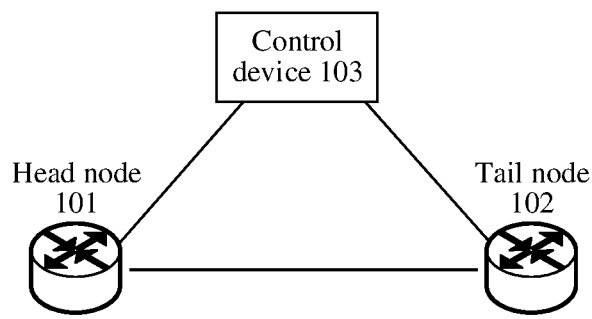
FIG. 2 is an architectural diagram of a system related to another path fault detection method according to an embodiment of this application.

Optionally, the forward path is obtained by the head node 101 through path computation. Alternatively, as shown in FIG. 2, the system further includes a control device 103. After the forward path is obtained by the control device 103 through path computation, the control device 103 delivers hop-by-hop information of the forward path to the head node 101. Optionally, the return path is obtained by the head node 101, the tail node 102, or the control device 103 through path computation. If the return path is obtained by the control device 103 through path computation, the control device 103 delivers hop-by-hop information of the return path to the head node 101 and/or the tail node 102.

Optionally, in this embodiment of this application, the hop-by-hop information includes link information and/or node information. That is, a path may be represented by a link and/or nodes in the path. Correspondingly, in this embodiment of this application, a path fault includes a link fault and/or a node fault.

It should be noted that, when the system further includes the control device 103, the control device 103 is configured to implement a function such as path computation. In this way, pressure of the head node 101 and the tail node 102 can be reduced.

Optionally, the system further includes an intermediate node, and the intermediate node is configured to forward a packet between the head node 101 and the tail node 102. For example, the first fault detection packet sent by the head node 101 is forwarded to the tail node 102 through an intermediate node on the return path, and the second fault detection packet sent by the tail node 102 is forwarded to the head node 101 through an intermediate node on the return path.

Optionally, in this embodiment of this application, the system includes one or more head nodes, and a tunnel is established between the one or more head nodes and a same tail node for communication. Optionally, the system includes one or more tail nodes, and a tunnel is established between the one or more tail nodes and a same head node for communication. In the following embodiment, an example in which a tunnel is established between one head node 101 and one tail node 102 in the system for communication, and fault detection is performed on the forward path in a communication process is used for description.

Optionally, in this embodiment of this application, one tunnel corresponds to one active forward path and one standby forward path, that is, the forward path may include an active forward path and a standby forward path. After determining, by using the path fault detection method provided in this embodiment of this application, that the active forward path is faulty, the head node 101 switches to the standby forward path to continue to communicate with the tail node 102. Optionally, an active forward path and a standby forward path each correspond to one return path, the return path corresponding to the active forward path covers the active forward path, and the return path corresponding to the standby forward path covers the standby forward path. In some other embodiments, one tunnel may include a plurality of forward paths, for example, include a plurality of active forward paths and a plurality of corresponding standby forward paths. Different forward paths may be used to implement different services.

Optionally, in this embodiment of this application, the head node, the tail node, and the control device further have a function of automatically updating a path. For example, when a network topology changes or when it is determined that the forward path is faulty, the forward path and the corresponding return path are updated. For a specific implementation, refer to detailed descriptions in the following method embodiments.

In this embodiment of this application, the head node 101 and the tail node 102 each are any network device, for example, a router, a switch, a bridge, or a base station. The control device 103 is a network device, a computer device, a server, or the like, and the control device 103 may also be referred to as a controller.

Figure 3:
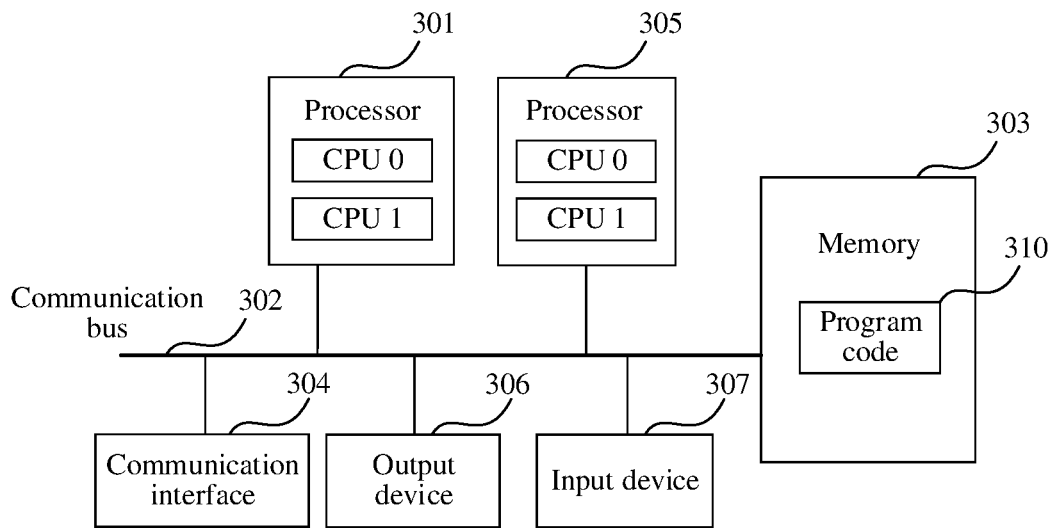
FIG. 3 is a schematic diagram of a structure of a communication device according to an embodiment of this application.

FIG. 3 is a schematic diagram of a structure of a communication device according to an embodiment of this application. Optionally, the communication device is the head node, the tail node, or the control device shown in FIG. 1 and FIG. 2. The communication device includes one or more processors 301, a communication bus 302, a memory 303, and one or more communication interfaces 304.

The processor 301 is a general-purpose central processing unit (CPU), a network processor (NP), a microprocessor, or one or more integrated circuits configured to implement the solutions in this application, for example, an application-specific integrated circuit (ASIC), a programmable logic device (PLD), or a combination thereof. Optionally, the PLD is a complex programmable logic device (CPLD), a field-programmable gate array (FPGA), a generic array logic (GAL), or any combination thereof.

The communication bus 302 is configured to transmit information between the foregoing components. Optionally, the communication bus 302 is classified into an address bus, a data bus, a control bus, and the like. For ease of indication, the bus is indicated by only one bold line in the figure. However, it does not indicate that there is only one bus or only one type of bus.

Optionally, the memory 303 is a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be used to carry or store expected program code in a form of instructions or a data structure and that is accessible to a computer. However, the memory 303 is not limited thereto. The memory 303 exists independently, and is connected to the processor 301 through the communication bus 302. Alternatively, the memory 303 is integrated with the processor 301.

The communication interface 304 is configured to communicate with another device or a communication network by using any transceiver-type apparatus. The communication interface 304 includes a wired communication interface, or optionally includes a wireless communication interface. The wired communication interface is, for example, an Ethernet interface. Optionally, the Ethernet interface is an optical interface, an electrical interface, or a combination thereof. The wireless communication interface is a wireless local area network (WLAN) interface, a cellular network communication interface, a combination thereof, or the like.

Optionally, in some embodiments, the communication device includes a plurality of processors, for example, the processor 301 and a processor 305 shown in FIG. 3. Each of these processors is a single-core processor or a multi-core processor. Optionally, the processor herein is one or more devices, circuits, and/or processing cores for processing data (for example, computer program instructions).

During specific implementation, in an embodiment, the communication device further includes an output device 306 and an input device 307. The output device 306 communicates with the processor 301, and can display information in a plurality of manners. For example, the output device 306 is a liquid crystal display (LCD), a light emitting diode (LED) display device, a cathode ray tube (CRT) display device, or a projector. The input device 307 communicates with the processor 301, and can receive user input in a plurality of manners. For example, the input device 307 is a mouse, a keyboard, a touchscreen device, or a sensing device.

In some embodiments, the memory 303 is configured to store program code 310 for executing the solutions in this application, and the processor 301 can execute the program code 310 stored in the memory 303. The program code 310 includes one or more software modules. The communication device can implement, by using the processor 301 and the program code 310 in the memory 303, the path fault detection method provided in the following embodiments in FIG. 4 to FIG. 11.

Figure 12:
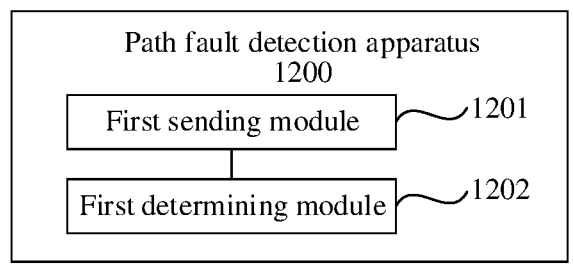
FIG. 12 is a schematic diagram of a structure of a path fault detection apparatus according to an embodiment of this application.

For example, when the communication device is a head node, the head node includes the processor 301 and the memory 303. Assuming that a first sending module 1201 and a first determining module 1202 shown in FIG. 12 are implemented by software, the program code 310 stored in the memory 303 may include a first sending module and a first determining module. The first sending module is configured to send a first fault detection packet to a tail node through a forward path. The first determining module is configured to: if a second fault detection packet sent by the tail node through a return path is received, determine that the forward path is not faulty.

Figure 13:
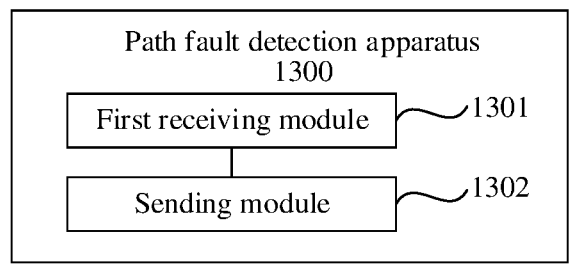
FIG. 13 is a schematic diagram of a structure of another path fault detection apparatus according to an embodiment of this application.

Similarly, when the communication device is a tail node, the tail node includes the processor 301 and the memory 303. Assuming that a first receiving module 1301 and a sending module 1302 shown in FIG. 13 are implemented by software, the program code 310 stored in the memory 303 may include a first receiving module and a sending module. The first receiving module is configured to receive a first fault detection packet sent by a head node through a forward path. The sending module is configured to send a second fault detection packet through a return path.

Figure 14:
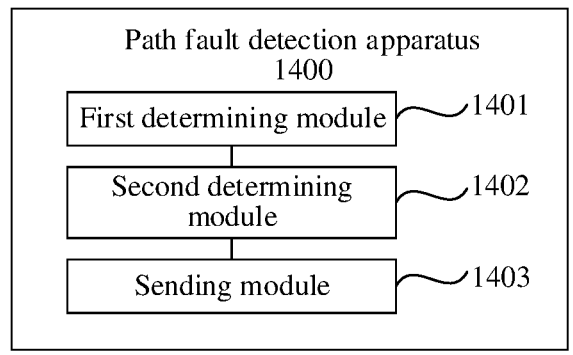
FIG. 14 is a schematic diagram of a structure of still another path fault detection apparatus according to an embodiment of this application.

When the communication device is a control device, the control device includes the processor 301 and the memory 303. Assuming that a first determining module 1401, a second determining module 1402, and a sending module 1403 shown in FIG. 14 are implemented by software, the program code 310 stored in the memory 303 may include a first determining module, a second determining module, and a sending module. The first determining module is configured to determine hop-by-hop information of a forward path. The second determining module is configured to determine a return path according to the hop-by-hop information of the forward path, where the return path includes the forward path. The sending module is configured to deliver a third path notification packet to a head node and/or a tail node, where the third path notification packet carries hop-by-hop information of the return path.

The following describes the path fault detection method provided in embodiments of this application.

In embodiments of this application, a head node sends a first fault detection packet to a tail node through a forward path, the tail node receives the first fault detection packet, and the tail node sends a second fault detection packet to the head node through a return path. The first fault detection packet indicates that the return path exists, the return path includes the forward path, the return path is determined according to the forward path, and the second fault detection packet is determined according to the first fault detection packet. If the head node receives the second fault detection packet sent by the tail node through the return path, the head node determines that the forward path is not faulty. Optionally, if the head node does not receive the second fault detection packet, the head node determines that the forward path is faulty.

It should be noted that, after the head node sends the first fault detection packet to the tail node, if the forward path is not faulty, the tail node can receive the first fault detection packet, and the tail node determines the second fault detection packet according to the first fault detection packet, and sends the second fault detection packet to the head node through the return path. If the head node receives the second fault detection packet, the head node determines that the forward path is not faulty. That is, if the return path is not faulty, the head node can receive the second fault detection packet, and the head node determines that the forward path is not faulty. If the return path is faulty, the head node cannot receive the second fault detection packet, and the head node determines that the forward path is faulty. Regardless of whether the forward path is faulty before or after the first fault detection packet arrives at the tail node, the head node can quickly sense the fault.

In conclusion, in embodiments of this application, the return path is determined according to the forward path. In a path fault detection process, the return path through which the fault detection packet fed back by the tail node to the head node passes includes the forward path. In this way, if the head node receives the fault detection packet fed back by the tail node, it indicates that the forward path is not faulty. It can be learned that, in the solutions, the return path covers the forward path, so that false detection can be avoided, thereby avoiding false switching caused by false detection, and mitigating impact on a communication service. It can be learned that the return path determined in the solutions is more appropriate.

It can be learned from the foregoing descriptions that the return path in embodiments of this application may be determined by the head node, the tail node, or the control device. The following uses four embodiments to separately describe implementations of determining the return path by the head node, the tail node, and the control device, and separately describe specific implementations of performing, by using the return path, path fault detection when the return path is determined by different devices. That is, the following describes, by using four embodiments, the path fault detection method provided in embodiments of this application. In the embodiments shown in FIG. 4 and FIG. 9, an example in which the head node determines the return path is used for description. In the embodiment shown in FIG. 10, an example in which the tail node determines the return path is used for description. In the embodiment shown in FIG. 11, an example in which the control device determines the return path is used for description.

Figure 4:
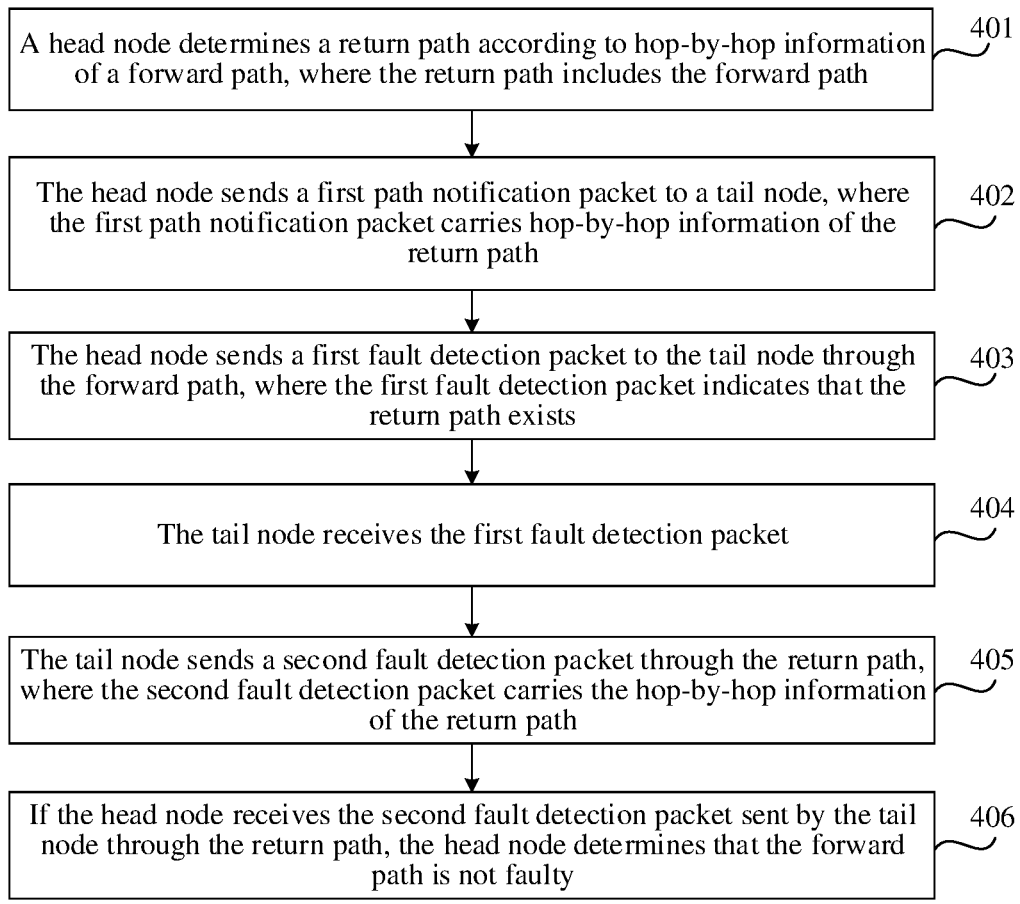
FIG. 4 is a flowchart of a path fault detection method according to an embodiment of this application.

FIG. 4 is a flowchart of a path fault detection method according to an embodiment of this application. In the embodiment shown in FIG. 4, that a head node determines a return path is used as an example. Refer to FIG. 4. The method includes the following steps.

Step 401: The head node determines the return path according to hop-by-hop information of a forward path, where the return path includes the forward path.

In this embodiment of this application, the head node determines the return path according to the hop-by-hop information of the forward path. For example, the head node uses a reverse link of a link in the forward path as a link in the return path. Alternatively, the head node uses network topology information and the hop-by-hop information of the forward path as input of a path algorithm, and obtains the return path through computation by using the path algorithm.

One or more links that are in a tunnel and through which a packet sent by the head node to a tail node passes constitute a link in the forward path. For example, the forward path is a path computed in a process of establishing a tunnel between the head node and the tail node. The forward path may be computed by the head node, or may be computed by a control device and then delivered to the head node. For example, assuming that the forward path is computed by the head node, the head node obtains network topology information, and obtains the forward path through computation according to the network topology information and information about the head node and tail node by using a path algorithm. Optionally, the path algorithm used to determine the forward path may be a shortest path first (SPF) algorithm (also referred to as a Dijkstra algorithm), a constrained shortest path first (CSPF) algorithm, or the like. A planning manner of the forward path is not limited in this embodiment of this application.

Optionally, assuming that the forward path includes an active forward path and a standby forward path, the head node determines a corresponding active return path according to the active forward path, and determines a corresponding standby return path according to the standby forward path. The active return path includes the active forward path, and the standby return path includes the standby forward path. That is, the active return path covers the active forward path, and the standby return path covers the standby forward path.

Optionally, the hop-by-hop information includes link information and/or node information. That is, a path may be represented by a link and/or nodes in the path. It should be noted that, if a path is represented by nodes, hop-by-hop may be loose or strict. For example, it is assumed that a fault detection packet sent by the head node to the tail node actually passes through a node 1, a node 2, a node 3, a node 4, and a node 5. In this case, the forward path may be represented by the node 1, the node 3, and the node 5. In this way, hop-by-hop of the forward path is loose. Alternatively, the forward path may be represented by the node 1, the node 2, the node 3, the node 4, and the node 5. In this case, hop-by-hop of the forward path is strict. If a path is represented by a link, hop-by-hop is strict. For example, if a fault detection packet sent by the head node to the tail node actually passes through a link 1, a link 2, a link 3, a link 4, and a link 5, the forward path is represented by the link 1, the link 2, the link 3, the link 4, and the link 5. In this case, hop-by-hop of the forward path is strict. An example in which hop-by-hop of the path is strict is used below for description.

Figure 5:
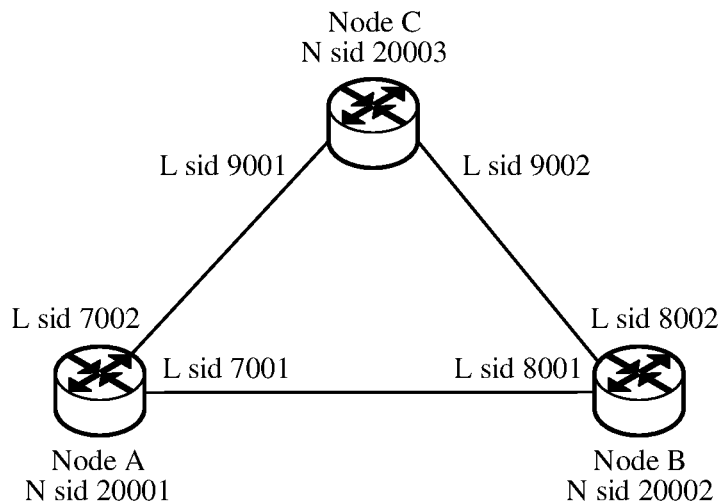
FIG. 5 is a schematic diagram of a network topology according to an embodiment of this application.

For example, in a network topology shown in FIG. 5, network topology information corresponding to the network topology is shown in Table 1. The network topology includes network devices A, B, and C, and one network device is one node. A node identifier of a node A (node) is denoted as 'node sid 20001', a link identifier of a link from A to B is denoted as 'link sid 7001', and a link identifier of a link from B to A is denoted as 'link sid 8001'. Other content in the table may be similarly explained, and details are not described herein. It should be noted that hop-by-hop information of a path may be represented by a link identifier of a link included in the path, or may be represented by node identifiers of nodes on the path. This is not limited in this embodiment of this application. When a path is represented by node identifiers, the hop-by-hop information of the forward path is represented by node sid according to a sequence of nodes on the forward path, and hop-by-hop information of the return path is represented by node sid according to a sequence of nodes on the return path. The full expansion of sid is segment identifier. It should be noted that, in this embodiment of this application, in the figure, a link sid is abbreviated to L sid for representation, and a node sid is abbreviated to N sid for representation.

TABLE 1

| | |
|---|---|
| link | A<->B, A->B link sid 7001, B->A link sid 8001 |
| link | A<->C, A->C link sid 7002, C->A link sid 9001 |
| link | B<->C, B->C link sid 8002, C->B link sid 9002 |
| node | A, node sid 20001 |
| node | B, node sid 20002 |
| node | C, node sid 20003 |

Based on FIG. 5, it is assumed that the head node is A, the tail node is B, the forward path includes an active forward path and a standby forward path, the active forward path is A->B, and a first hop for sending a packet on the active forward path corresponds to a link sid 7001. The standby forward path is A->C->B, a first hop for sending a packet on the standby forward path corresponds to a link sid 7002, and a second hop corresponds to a link sid 9002. The head node A separately computes an active return path and a standby return path according to a constrained shortest path first (CSPF) algorithm. In a process of computing the active return path, a constraint condition of the CSPF algorithm includes the active forward path. For example, an active forward path of a BFD packet is A->B, a corresponding link sid is 7001, and a link sid of a reverse link of the link is 8001. In this case, a constraint condition of the active return path automatically obtained by using the CSPF algorithm includes 'include link sid 8001 (B->A) strict', that is, includes a link whose link sid is 8001. The active return path computed according to the constraint condition of the active return path is B->A, and a first hop for sending a packet on the active return path corresponds to a link sid 8001. Similarly, a constraint condition of the standby return path obtained by the head node includes 'include link sid 8002 (B->C) strict, include link sid 9001 (C->A) strict'. The standby return path computed according to the constraint condition of the standby return path is B->C->A, a first hop for sending a packet on the standby return path corresponds to a link sid 8002, and a second hop corresponds to a link sid 9001. It can be learned that the computed forward path is consistent with the computed return path.

Optionally, the return path meets a specified condition, and the specified condition includes one or more of a lowest cost, a maximum bandwidth, and a minimum hop count. For example, assuming that a plurality of candidate paths exist in reachable paths from the tail node to the tail head node, and each of the plurality of candidate paths includes a forward path, a candidate path that meets a specified condition is determined from the plurality of candidate paths. If there is only one candidate path that meets the specified condition, the candidate path is determined as a return path. If there is more than one candidate path that meets the specified condition, one of the candidate paths that meet the specified condition is randomly selected as a return path.

For example, it is assumed that the specified condition includes a lowest cost, a maximum bandwidth, and a minimum hop count. In an implementation, a path computation process of a path algorithm designed according to the specified condition is: obtaining a path with a lowest cost from the tail node to the head node; if there are a plurality of paths with a lowest cost, selecting a path including the forward path from the paths with a lowest cost; if there are still a plurality of paths with a lowest cost and including the forward path, selecting a path with a maximum minimum available bandwidth from the plurality of paths; if there are still a plurality of paths with a maximum minimum available bandwidth, selecting a path with a minimum hop count from the plurality of paths; and if there are still a plurality of paths with a minimum hop count, randomly selecting a path from the paths with a minimum hop count as a return path. That is, the head node sequentially selects the return path according to a lowest cost, including a forward path, a maximum bandwidth, and a minimum hop count. Certainly, a sequence of the four conditions of a lowest cost, including a forward path, a maximum bandwidth, and a minimum hop count may be determined according to a requirement. This is not limited in this embodiment of this application. For example, the head node may alternatively sequentially select the return path according to a maximum bandwidth, including a forward path, a lowest cost, and a minimum hop count.

In this embodiment of this application, that the forward path is used as a constraint condition of the CSPF algorithm may be considered as an extension of a conventional CSPF algorithm. That is, in this embodiment of this application, the return path is computed according to an extended CSPF algorithm. It should be noted that the extended CSPF algorithm further considers one or more of a lowest cost, a maximum bandwidth, and a minimum hop count.

Optionally, in a load sharing scenario, the forward path includes a plurality of load sharing paths, any load sharing path is used to bear a part or all of a load between the head node and the tail node, and the return path includes the plurality of load sharing paths.

Figure 6:
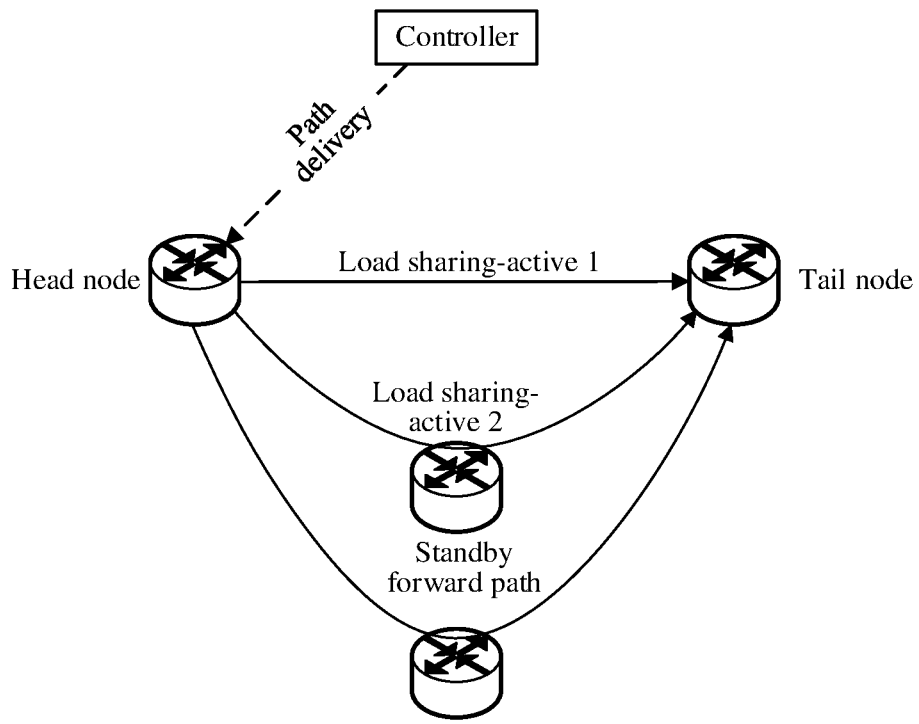
FIG. 6 is a schematic diagram of load sharing according to an embodiment of this application.
Figure 7:
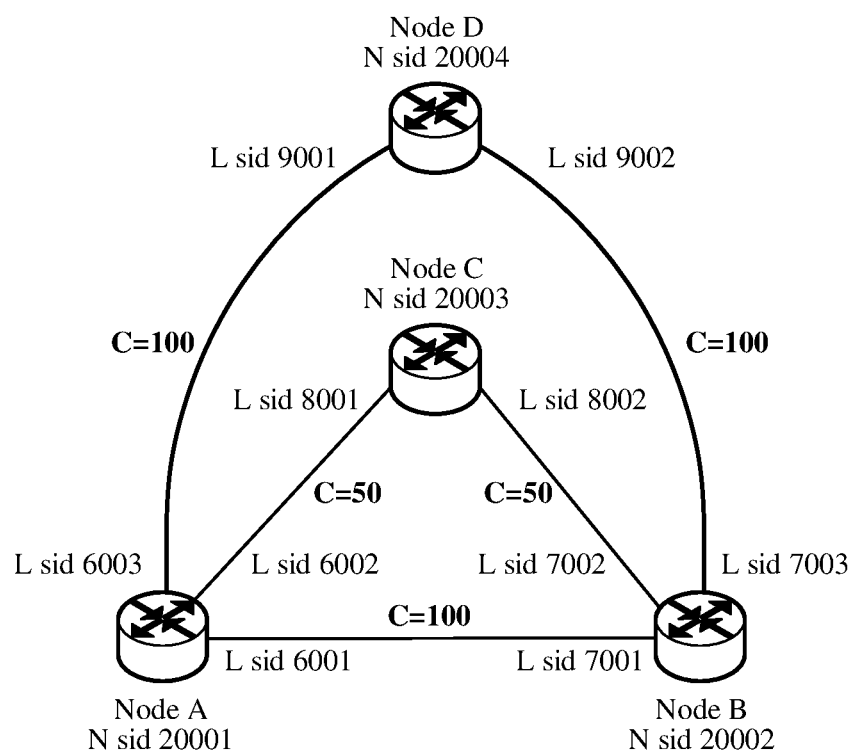
FIG. 7 is a schematic diagram of another network topology according to an embodiment of this application.

For example, as shown in FIG. 6, the forward path includes an active forward path and a standby forward path. The active forward path includes a load sharing active path 1 (load sharing-active 1) and a load sharing active path 2 (load sharing-active 2). The load sharing active path 1 and the load sharing active path 2 each bear a part of a load between the head node and the tail node. FIG. 7 is a diagram of a network topology corresponding to FIG. 6, and network topology information of the network topology is shown in Table 2. The load sharing active path 1 is A->B, and a first hop for forwarding a packet on the load sharing active path 1 corresponds to a link sid 6001. The load sharing active path 2 is A->C->B, a first hop for forwarding a packet on the load sharing active path 2 corresponds to a link sid 6002, and a second hop corresponds to a link sid 8002. The standby forward path is A->D->B, a first hop for forwarding a packet on the standby forward path corresponds to a link sid 6003, and a second hop corresponds to a link sid 9002. In FIG., when C=50, it indicates that a maximum allowable load of a corresponding link is 50, which may be understood as that a bandwidth of the corresponding link is 50. When C=100, it indicates that a maximum allowable load of a corresponding link is 100, which may be understood as that a bandwidth of the corresponding link is 100.

TABLE 2

| link | A<->B, A->B link sid 6001, B->A link sid 7001 |
| link | A<->C, A->C link sid 6002, C->A link sid 8001 |
| link | B<->C, B->C link sid 7002, C->B link sid 8002 |
| link | A<->D, A->D link sid 6003, D->A link sid 9001 |
| link | B<->D, B->D link sid 7003, D->B link sid 9002 |
| node | A, node sid 20001 |
| node | B, node sid 20002 |
| node | C, node sid 20003 |
| node | D, node sid 20004 |

Based on FIG. 6, FIG. 7, and Table 2, if the return path is planned according to the conventional CSPF algorithm, the planned active return path and the load sharing active path 1 are co-routed, that is, the active return path is B->A, and a first hop for forwarding a packet on the planned return path corresponds to a link sid 7001. In this way, if service loads on both the two load sharing active paths between A and B reach more than 50%, and the load sharing active path 2 is disconnected (for example, due to a link fault), the fault cannot be sensed according to a fault detection packet fed back by B. Consequently, convergence sensing is slow, and a service is greatly affected instantly when the fault occurs. If all services are switched to the load sharing active path 1 instantly when the fault occurs, a quantity of services on the load sharing active path 1 exceeds 100%, causing continuous service congestion and impact.

Considering that a standby forward path A->D->B actually exists between the head node and the tail node, and a path bandwidth of the standby forward path is greater than a sum of path bandwidths of the load sharing active path 1 and the load sharing active path 2, it can be learned that the standby forward path may bear all service loads when a path in any load sharing active path is faulty, so that a service is not affected. Therefore, in this embodiment of this application, the return path includes a plurality of load sharing paths of the forward path, that is, the return path covers all load sharing paths of the forward path. Therefore, the planned active return path is B->C->A->B->A, B->A->C->B->A, or another path including links in the load sharing active path 1 and the load sharing active path 2. It may be understood that the planned active return path is co-routed with the load sharing active path 1 and the load sharing active path 2, and the active return path covers all load sharing active paths. According to the path planning, if any path in the load sharing active path is faulty, the fault is instantly detected, and all services are switched to the standby forward path A->D->B. In this way, the path fault is instantly sensed, and the services are switched in time, thereby shortening a transient service impact time, and preventing continuous service impact.

It should be noted that load sharing between the head node and the tail node may be implemented according to a plurality of boards such as service boards and transceiver boards on the head node, and one board bears a part of a load of the head node.

Optionally, in this embodiment of this application, a link in the return path is consistent with a link in the forward path. For example, the hop-by-hop information includes link information. In a process in which the head node determines the return path according to the hop-by-hop information of the forward path, a reverse link of a link in the forward path is used as a link in the return path, so that consistency of the forward path and the return path can be strictly ensured, and false detection of a path fault can be avoided.

Optionally, there may be more than one tunnel between the head node and the tail node, and one head node may alternatively establish tunnels with a plurality of tail nodes. Therefore, there may be more than one forward path between the head node and the tail node, and one forward path corresponds to one return path. In this way, to distinguish between different return paths, a corresponding path identifier further needs to be set for each return path.

Optionally, when the return path is determined by the head node, a path identifier corresponding to the return path is selected by the head node or the tail node from a specified identifier set. For example, a communication protocol between the head node and the tail node stipulates a specified identifier set. In this case, the head node or the tail node selects a path identifier from the specified identifier set as the path identifier corresponding to the return path, for example, in sequence. Alternatively, a path identifier that has not been selected is randomly selected from the specified identifier set. For example, the identifier set includes 1 to 1024, that is, there are 1024 path identifiers in total. In this case, the head node selects a path identifier that has not been selected from 1 to 1024 each time.

Alternatively, the path identifier corresponding to the return path is randomly generated by the head node or the tail node. That is, if there is no specified identifier set between the head node and the tail node, the head node or the tail node randomly generates a path identifier, and uses the path identifier as the path identifier corresponding to the return path.

Optionally, the path identifier corresponding to the return path is a binding segment identifier (binding sid, BSID). That is, in this embodiment of this application, a binding sid represents the path identifier corresponding to the return path.

Alternatively, the path identifier is a session identifier (session ID) of a session between the head node and the tail node.

It can be learned from the foregoing descriptions that, if only one tunnel can be created between the head node and the tail node, that is, a packet sent by the head node to the tail node has only one forward path, there is only one return path, and a corresponding path identifier is not required for the return path. If a plurality of tunnels can be created between the head node and the tail node, that is, a packet sent by the head node to the tail node may have a plurality of forward paths, there are also a plurality of corresponding return paths. In this way, a corresponding path identifier is required for the return path. Considering that a plurality of tunnels can be created between the head node and the tail node in general communication, the following embodiment is described by using an example in which the return path corresponds to a path identifier.

Step 402: The head node sends a first path notification packet to the tail node, where the first path notification packet carries hop-by-hop information of the return path.

In this embodiment of this application, after determining the return path, the head node sends the first path notification packet to the tail node, where the first path notification packet carries the hop-by-hop information of the return path. That is, the head node notifies the tail node of the return path. In this way, in an implementation, the tail node may subsequently encapsulate the hop-by-hop information of the return path into a second fault detection packet, so that the tail node and a network device between the head node and the tail node forwards the second fault detection packet according to the return path.

Optionally, the first path notification packet includes a first type-length-value (type-length-value, TLV) field, and the first TLV field carries the hop-by-hop information of the return path. The value of the first TLV field includes the hop-by-hop information of the return path. For example, the value includes a link sid 1, a link sid 2, . . . , and a link sid n, where links corresponding to the link sid 1, the link sid 2, . . . , and the link sid n constitute the return path. Optionally, the value of the first TLV field further includes the path identifier corresponding to the return path, for example, a binding sid, that is, the head node notifies the tail node of the path identifier corresponding to the return path. Optionally, the value of the first TLV field further includes algorithm information, for example, an algorithm, that is, the head node notifies the tail node of a path algorithm used to determine the return path.

For example, an extended TLV is added according to the interior network protocol (interior gateway protocols, IGP), and the extended TLV is used as the first TLV. For example, the first TLV is <SR BFD return path sub TLV>, that is, the first TLV is an extended sub-TLV, and the sub-TLV is used to carry hop-by-hop information of a BFD return path in an SR tunneling protocol. For example, the value of the sub-TLV includes an algorithm, a binding sid, a prefix/link sid 1, a prefix/link sid 2, . . . , and a prefix/link sid n.

In this embodiment of this application, after the head node sends the first path notification packet to the tail node, whether the forward path is faulty, that is, whether a link in the tunnel is faulty, can be detected between the head node and the tail node according to the planned forward path and the planned return path.

The first path notification packet may fail to be sent to the tail node, or the tail node fails to parse the first path notification packet, that is, the tail node does not obtain the hop-by-hop information of the return path. Therefore, if the head node subsequently sends the first path fault detection packet to the tail node, the tail node may not feed back the second path fault detection packet according to a path that is the same as the return path planned by the head node, and consequently the path fault cannot be accurately detected. Considering this case, optionally, in this embodiment of this application, after sending the first path notification packet to the tail node, the head node receives a first response packet sent by the tail node, where the first response packet carries the path identifier of the return path. Optionally, after receiving the first response packet, the head node sets the path identifier corresponding to the return path to an available state. In this way, after confirming the tail node, the head node feeds back the second path fault detection packet according to the return path.

Optionally, in this embodiment of this application, the first path notification packet is used by the tail node to generate a path binding relationship between the hop-by-hop information of the return path and a path identifier. After receiving the first path notification packet, the tail node generates the path binding relationship between the hop-by-hop information of the return path and the corresponding path identifier.

For example, if the path identifier is a BSID, and the path identifier corresponding to the return path is selected by the head node from a specified identifier set or randomly generated by the head node, the first path notification packet further carries the path identifier corresponding to the return path. After receiving the first path notification packet, the tail node parses the first path notification packet to obtain the hop-by-hop information of the return path and the path identifier, and stores the path binding relationship between the hop-by-hop information of the return path and the path identifier.

If the path identifier is a BSID, and the path identifier corresponding to the return path is selected by the tail node from a specified identifier set or randomly generated by the tail node, after receiving the first path notification packet, the tail node selects a BSID from the specified identifier set as the path identifier corresponding to the return path, or the tail node randomly generates a BSID as the path identifier corresponding to the return path, and stores the path binding relationship between the hop-by-hop information of the path identifier and the path identifier.

If the path identifier is a session identifier, the first path notification packet further carries the session identifier. After receiving and parsing the first path notification packet, the tail node obtains the hop-by-hop information of the return path and the session identifier, and stores the path binding relationship between the hop-by-hop information of the return path and the session identifier.

Step 403: The head node sends a first fault detection packet to the tail node through the forward path, where the first fault detection packet indicates that the return path exists.

In this embodiment of this application, the head node and the tail node send fault detection packets to each other to detect whether the forward path is faulty. For example, the head node periodically sends a fault detection packet to the tail node, and the tail node feeds back a fault detection packet to the head node; and/or the tail node periodically sends a fault detection packet to the head node, and the head node feeds back a fault detection packet to the tail node. This embodiment of this application is described by using an example in which a fault detection packet sent by the head node to the tail node through the forward path is the first fault detection packet.

Optionally, the first fault detection packet is a BFD packet, an S-BFD packet, or a packet of another type. The BFD packet is a high-speed independent 'Hello' protocol packet, and can achieve millisecond-level path fault detection. The BFD packet is used in a label switched path (label switched path, LSP) for multi-protocol label switching (multi-protocol label switching, MPLS), that is, in BFD for MPLS LSP, an end-to-end BFD packet is used to quickly perform fault detection, so as to implement fault detection and active/standby path switching for MPLS forwarding.

In this embodiment of this application, before the head node sends the first fault detection packet to the tail node through the forward path, the head node generates the first fault detection packet, where the first fault detection packet carries the path identifier corresponding to the return path, and the first fault detection packet indicates the tail node to determine, from the path binding relationship, the hop-by-hop information of the return path that corresponds to the path identifier; and generates the second fault detection packet in which the hop-by-hop information of the return path is encapsulated. That is, the head node encapsulates the path identifier corresponding to the return path into the first fault detection packet. After receiving and parsing the first fault detection packet, the tail node determines the corresponding return path according to the path identifier, and encapsulates the hop-by-hop information of the return path into the second fault detection packet. In this way, the second fault detection packet can be forwarded to the head node according to the return path.

For example, the path identifier is a BSID, and the hop-by-hop information is link information. The head node encapsulates a forward path label stack and a binding sid into the first fault detection packet. An intermediate node forwards the first fault detection packet according to a sequence of link identifiers of links in the forward path that are pushed into the forward path label stack. Each time a packet passes through an intermediate node, the corresponding intermediate node forwards the packet according to an uppermost link identifier in the forward path label stack, and pops up the uppermost link identifier before the forwarding, that is, updates the first fault detection packet until the packet is forwarded to the tail node. If the forward path label stack in the first fault detection packet received by the tail node is empty, it indicates that the tail node is a last-hop receiver of the first fault detection packet, and the tail node no longer forwards the first fault detection packet. Similarly, if the path identifier is a session identifier, and the hop-by-hop information is link information, the first fault detection packet generated by the head node encapsulates the session identifier and a forward path label stack, and the first fault detection packet is forwarded to the tail node according to the forward path label stack. The forward path label stack in the first fault detection packet received by the tail node is empty.

Optionally, because the head node does not receive the first path notification packet, or the tail node fails to parse the first path notification packet (for example, the tail node does not support parsing of the first TLV), the head node does not receive the first response packet fed back by the tail node. In this case, before sending the first fault detection packet to the tail node through the forward path, the head node encapsulates the hop-by-hop information of the return path into the first fault detection packet. For example, the head node encapsulates the forward path label stack and a return path label stack into the first fault detection packet according to a link sequence, and the first fault detection packet sequentially passes through the head node, the intermediate node, the tail node, the intermediate node, and the head node.

It should be noted that, compared with the implementation in which the forward path label stack and the return path label stack are encapsulated into the first fault detection packet, the implementation in which the forward path label stack and the path identifier (for example, the binding sid) are encapsulated into the first fault detection packet can reduce a quantity of label stack layers. This facilitates sending of the first fault detection packet.

In addition, in this embodiment of this application, if the first fault detection packet carries the path identifier, the path identifier indirectly indicates the return path. If the first fault detection packet carries the hop-by-hop information of the return path, the first fault detection packet directly indicates the return path.

Step 404: The tail node receives the first fault detection packet.

It should be noted that, after the head node sends the first fault detection packet, if the forward path is not faulty, the tail node can receive the first fault detection packet. If the forward path is faulty (for example, a link fault and/or a node fault), the tail node cannot receive the first fault detection packet.

Step 405: The tail node sends the second fault detection packet through the return path, where the second fault detection packet carries the hop-by-hop information of the return path.

In this embodiment of this application, for example, the head node notifies the tail node of the hop-by-hop information of the return path and the corresponding path identifier. After receiving the first fault detection packet, the tail node parses the first fault detection packet to obtain the path identifier (for example, the binding sid), obtains the corresponding hop-by-hop information of the return path from the stored path binding relationship according to the path identifier, and generates the second fault detection packet, where the second fault detection packet carries the hop-by-hop information of the return path. For example, the hop-by-hop information includes link information. The tail node encapsulates a return path label stack into the second fault detection packet, and link identifiers of links in the return path are pushed into the return path label stack according to a link sequence. A process of forwarding the second fault detection packet is similar to the principle of forwarding the first fault detection packet, and details are not described herein again.

Optionally, if the head node encapsulates the hop-by-hop information of the return path into the first fault detection packet, after receiving the first fault detection packet, the tail node continues to forward the first fault detection packet according to the encapsulated hop-by-hop information of the return path, that is, the second fault detection packet and the first fault detection packet are the same.

For example, if the head node encapsulates the forward path label stack and the return path label stack into the first fault detection packet according to a link sequence, the first fault detection packet sequentially passes through the head node, the intermediate node, the tail node, the intermediate node, and the head node. In this case, the tail node only needs to forward the first fault detection packet according to the return path. In this way, the tail node does not need to support a parsing function of the extended TLV field, but only needs to support a basic SR function and complete forwarding of the BFD packet. The tail node does not sense a unidirectional tunnel status of the head node or a BFD status, and therefore dependency on a capability of the tail node is low.

In this embodiment of this application, after receiving the first fault detection packet, the tail node sends the second fault detection packet through the return path.

For example, if the hop-by-hop information of the return path is not encapsulated into the first fault detection packet, and the return path corresponds to the path identifier, the tail node correspondingly stores the hop-by-hop information of the return path and the path identifier in the path binding relationship, and the first fault detection packet carries the path identifier. In this case, before sending the second fault detection packet through the return path, the tail node determines, from the path binding relationship, the hop-by-hop information of the return path that corresponds to the path identifier carried in the first fault detection packet, and generates the second fault detection packet, where the second fault detection packet carries the hop-by-hop information of the return path. For example, the path identifier of the return path is a binding sid, the first fault detection packet is a first BFD packet, and the binding sid is encapsulated into the first BFD packet. In this case, after parsing the first BFD packet to obtain the binding sid, the tail node determines, from the stored path binding relationship, the hop-by-hop information of the return path that corresponds to the binding sid, and generates a second BFD packet as the second fault detection packet, where the second BFD packet carries the hop-by-hop information of the return path, for example, a return path label stack is encapsulated into the second BFD packet.

If the hop-by-hop information of the return path is encapsulated into the first fault detection packet, the tail node only needs to forward the first fault detection packet as the second fault detection packet, that is, the second fault detection packet and the first fault detection packet are the same. For example, if the return path label stack is encapsulated into the first fault detection packet, the tail node only needs to forward the first fault detection packet according to the return path label stack.

Step 406: If the head node receives the second fault detection packet sent by the tail node through the return path, the head node determines that the forward path is not faulty.

In this embodiment of this application, after the head node sends the first fault detection packet to the tail node, if the forward path is not faulty, the tail node can receive the first fault detection packet, and the tail node determines the second fault detection packet according to the first fault detection packet, and sends the second fault detection packet to the head node through the return path. If the head node receives the second fault detection packet, the head node determines that the forward path is not faulty. That is, if neither the forward path nor the return path is faulty, the head node can receive the second fault detection packet, and the head node determines that the forward path is not faulty.

Optionally, the second fault detection packet is a BFD packet or an S-BFD packet.

Optionally, in this embodiment of this application, after the head node sends the first fault detection packet to the tail node, if the second fault detection packet is not received, the head node determines that the forward path is faulty. That is, if the forward path and/or the return path are/is faulty, the head node cannot receive the second fault detection packet, and the head node determines that the forward path is faulty. Regardless of whether the forward path is faulty before or after the first fault detection packet arrives at the tail node, the head node can quickly sense the fault.

If the forward path is faulty before the first fault detection packet arrives at the tail node, the tail node cannot receive the first fault detection packet, and does not send the second fault detection packet. In this case, the head node cannot receive the second fault detection packet. If the forward path is faulty after the tail node receives the first fault detection packet, the head node cannot receive the second fault detection packet.

Optionally, response duration is set for the head node. If the head node does not receive the second fault detection packet within the response duration after sending the first fault detection packet, that is, the tail node does not respond within the response duration, the head node determines that the forward path is faulty.

Optionally, the forward path includes an active forward path and a standby forward path. If the head node sends the first fault detection packet through the active forward path, and the standby forward path exists, after the head node determines that the active forward path is faulty, the head node quickly switches the packet to the standby forward path, that is, the head node sends the packet through the standby forward path, thereby mitigating impact on a communication service.

Optionally, in this embodiment of this application, the standby forward path corresponds to a standby return path. In this way, in a process in which the head node communicates with the tail node through the standby forward path, fault detection may be performed on the standby forward path between the head node and the tail node according to the standby forward path and the standby return path.

Optionally, in this embodiment of this application, the head node can further automatically update a path. For example, when detecting that the forward path is faulty, the head node automatically updates the path. For example, after determining that the forward path is faulty, the head node re-determines a forward path, and updates the return path according to the re-determined forward path.

It can be learned from the foregoing descriptions that the forward path may include an active forward path and a standby forward path. If the head node sends the first fault detection packet through the active forward path, and the standby forward path exists, after the head node determines that the active forward path is faulty, the head node quickly switches the packet to the standby forward path, that is, the head node sends the packet through the standby forward path, thereby mitigating impact on a communication service. Optionally, after switching the packet to the standby forward path, the head node uses the standby forward path as the active forward path, and re-determines a standby forward path and a standby return path, so as to quickly perform switching when a second fault occurs, thereby mitigating impact on a communication service.

Figure 8:
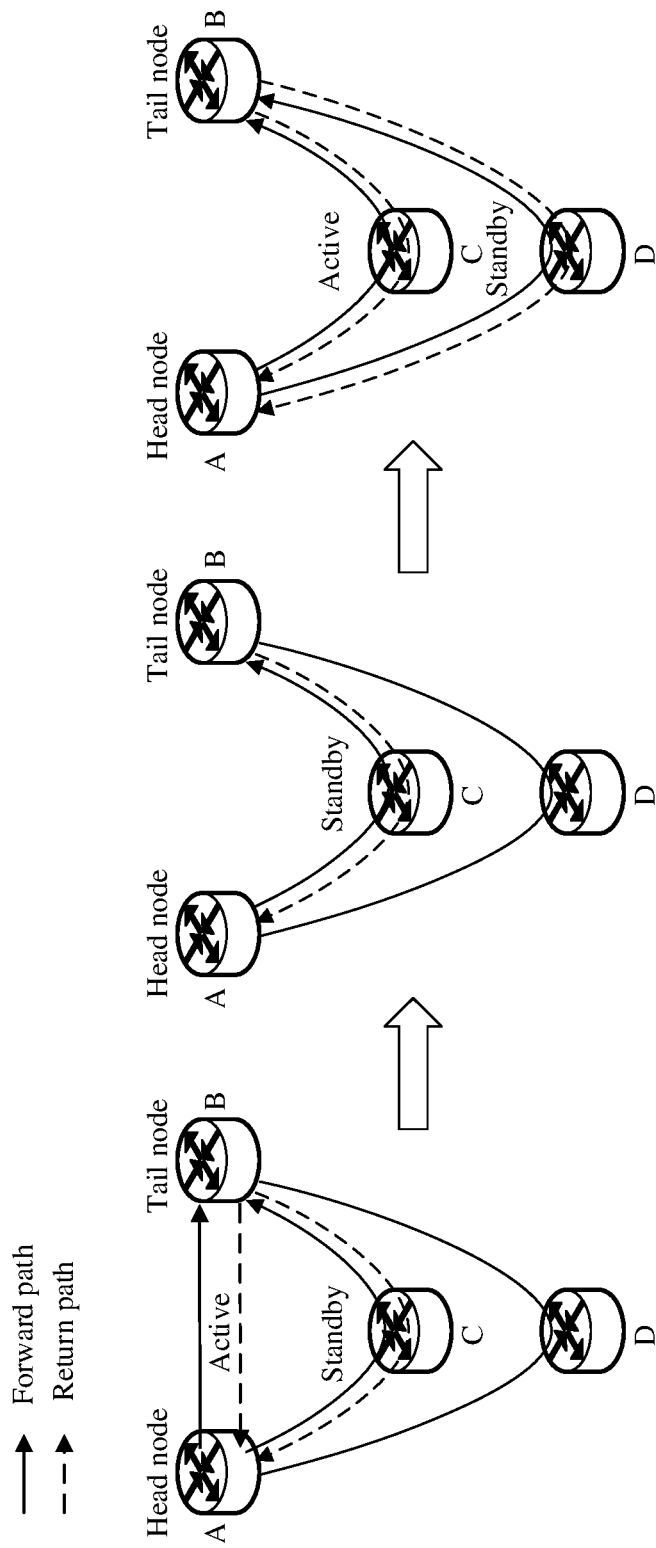
FIG. 8 is a schematic diagram of path updating according to an embodiment of this application.

For example, as shown in FIG. 8, if a link in an active forward path A->B is faulty, the head node quickly switches the packet to a standby forward path A->C->B. Then, the master node updates the standby forward path A->C->B as the active forward path, and re-determines a standby forward path A->D->B. In this way, if a path in the updated active forward path A->C->B is faulty, that is, when a second fault occurs, the head node quickly senses the fault, and switches the packet to the re-determined standby forward path A->D->B.

In this embodiment of this application, it can be learned from the foregoing descriptions that the head node may compute the standby return path corresponding to the standby forward path. In this way, in a process in which the head node communicates with the tail node through the standby forward path, fault detection may be performed on the standby forward path between the head node and the tail node according to the standby forward path and the standby return path.

When both the forward path and the return path are determined by the head node, if the head node determines that the forward path is faulty, for example, the head node senses that both the active forward path and the standby forward path are faulty, the head node re-determines a forward path, and updates the return path according to hop-by-hop information of the re-determined forward path. Optionally, after updating the return path, the head node sends a path notification packet to the tail node, where the path notification packet carries the hop-by-hop information of the updated return path. That is, the head node has a function of automatically updating a path, and the head node re-plans the forward path and the return path, and notifies the tail node of the re-planned return path. Then, path fault detection is performed between the head node and the tail node with reference to the foregoing implementation.

In conclusion, in this embodiment of this application, the return path is determined according to the forward path. In a path fault detection process, the return path through which the fault detection packet fed back by the tail node to the head node passes includes the forward path. In this way, if the head node receives the fault detection packet fed back by the tail node, it indicates that the forward path is not faulty. It can be learned that, in this solution, the return path covers the forward path, so that false detection can be avoided, thereby avoiding false switching caused by false detection, and mitigating impact on a communication service.

In addition, in this solution, manual configuration is not required. This improves fault detection efficiency, and can avoid a case in which a communication service is affected because manual configuration cannot be performed in time after a path fault occurs. In addition, the return path determined in this solution does not consider only a shortest path, but considers that the return path needs to include the forward path. That is, the return path in this solution is more appropriate.

Figure 9:
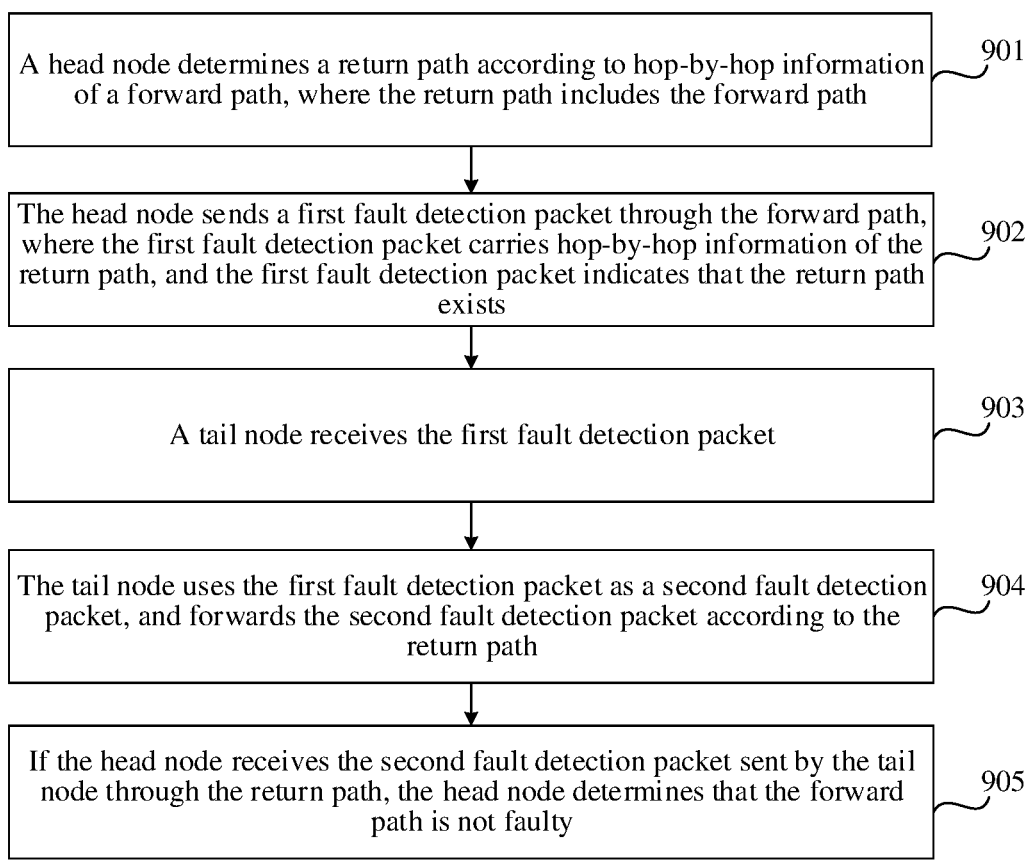
FIG. 9 is a flowchart of another path fault detection method according to an embodiment of this application.

FIG. 9 is a flowchart of another path fault detection method according to an embodiment of this application. In the embodiment shown in FIG. 9, that a head node determines a return path is used as an example. Refer to FIG. 9. The method includes the following steps.

Step 901: The head node determines the return path according to hop-by-hop information of a forward path, where the return path includes the forward path.

For a specific implementation of determining the forward path and the return path, refer to the related descriptions of step 401 in the embodiment in FIG. 4. Details are not described herein again.

Optionally, in this embodiment, after determining the return path, the head node does not need to notify a tail node of hop-by-hop information of the return path.

Step 902: The head node sends a first fault detection packet through the forward path, where the first fault detection packet carries the hop-by-hop information of the return path, and the first fault detection packet indicates that the return path exists.

In this embodiment of this application, before sending the first fault detection packet to the tail node through the forward path, the head node generates the first fault detection packet, where the first fault detection packet carries the hop-by-hop information of the return path, and the first fault detection packet indicates the tail node to use the first fault detection packet as a second fault detection packet, and forward the second fault detection packet according to the return path. Then, the head node sends the first fault detection packet through the forward path. That is, the head node does not need to notify the tail node of the hop-by-hop information of the return path, but directly encapsulates the return path into the first fault detection packet. The tail node only needs to forward the first fault detection packet according to the return path.

For example, the head node encapsulates a forward path label stack and a return path label stack into the first fault detection packet according to a link sequence, and an intermediate node and the tail node only need to perform forwarding according to the path label stacks. That is, the first fault detection packet sequentially passes through the head node, the intermediate node, the tail node, the intermediate node, and the head node. Compared with an implementation in which the head node notifies the tail node of the hop-by-hop information of the return path through an extended TLV, in this embodiment, the head node does not need to determine whether the tail node supports a parsing function of the extended TLV field, but only needs to support a basic SR function and complete forwarding of a BFD packet. The tail node does not sense a unidirectional tunnel status of the head node or a BFD status, and therefore dependency on the tail node is low.

Step 903: The tail node receives the first fault detection packet.

It should be noted that, after the head node sends the first fault detection packet, if the forward path is not faulty, the tail node can receive the first fault detection packet.

Step 904: The tail node uses the first fault detection packet as the second fault detection packet, and forwards the second fault detection packet according to the return path.

As described above, after the first fault detection packet is forwarded to the tail node, the tail node only needs to forward the first fault detection packet according to the return path, for example, continue to forward the first fault detection packet according to the return path label stack.

Step 905: If the head node receives the second fault detection packet sent by the tail node through the return path, the head node determines that the forward path is not faulty.

Optionally, if the head node does not receive the second fault detection packet, the head node determines that the forward path is faulty.

It should be noted that, for an implementation of step 905, refer to the related descriptions in step 406. Details are not described herein again.

Optionally, in this embodiment of this application, the head node can further automatically update a path. For example, when detecting that the forward path is faulty, the head node automatically updates the path. For example, when the forward path is determined by the head node, the head node re-determines a forward path. When the forward path is determined by a control device, the control device re-determines a forward path, and delivers hop-by-hop information of the re-determined forward path to the head node. The head node re-determines a return path according to the hop-by-hop information of the re-determined forward path, where the re-determined return path includes the re-determined forward path. Then, the head node encapsulates hop-by-hop information of the re-determined return path into a fault detection packet, and sends the fault detection packet to the tail node through the re-determined forward path, to perform path fault detection. In this way, the head node can quickly sense a path fault, quickly perform switching, and automatically update the forward path and the return path in time, thereby mitigating impact on a communication service. For an implementation in which the head node automatically updates a path, refer to the related descriptions in the embodiment in FIG. 4. Details are not described herein again.

In conclusion, in this embodiment of this application, in a path fault detection process, the return path through which the fault detection packet fed back by the tail node to the head node passes includes the forward path. In this way, if the head node receives the fault detection packet fed back by the tail node, it indicates that the forward path is not faulty. It can be learned that, in this solution, the return path covers the forward path, so that false detection can be avoided, thereby avoiding false switching caused by false detection, and mitigating impact on a communication service. In addition, in this solution, manual configuration is not required. This improves fault detection efficiency, and can avoid a case in which a communication service is affected because manual configuration cannot be performed in time after a path fault occurs. In addition, the return path determined in this solution does not consider only a shortest path, but considers that the return path needs to include the forward path. That is, the return path in this solution is more appropriate.

Figure 10:
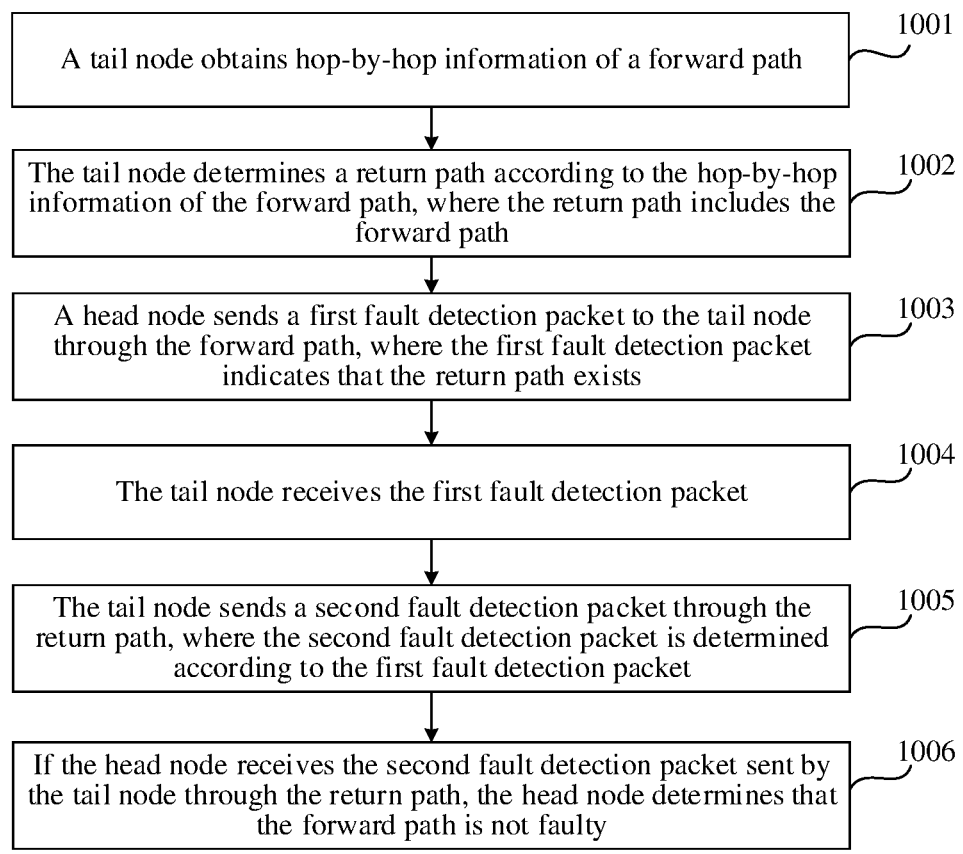
FIG. 10 is a flowchart of still another path fault detection method according to an embodiment of this application.

FIG. 10 is a flowchart of still another path fault detection method according to an embodiment of this application. In the embodiment shown in FIG. 10, that a tail node determines a return path is used as an example. Refer to FIG. 10. The method includes the following steps.

Step 1001: The tail node obtains hop-by-hop information of a forward path.

In this embodiment of this application, before sending a second fault detection packet through the return path, the tail node obtains the hop-by-hop information of the forward path.

Optionally, an implementation in which the tail node obtains the hop-by-hop information of the forward path is: The tail node receives a path computation request packet sent by a head node, where the path computation request packet carries the hop-by-hop information of the forward path. The tail node parses the path computation request packet to obtain the hop-by-hop information of the forward path. For example, when the head node determines the forward path, or a control device determines the forward path and delivers the forward path to the head node, the head node sends the path computation request packet to the tail node, where the path computation request packet carries the hop-by-hop information of the forward path. Certainly, when the control device determines the forward path, the control device may alternatively send the hop-by-hop information of the forward path to the tail node, to request the tail node to compute the return path.

Optionally, the path computation request packet further carries algorithm information. After parsing the path computation request packet, the tail node subsequently determines the return path according to the algorithm information.

Step 1002: The tail node determines the return path according to the hop-by-hop information of the forward path, where the return path includes the forward path.

In this embodiment of this application, the tail node determines the return path according to the hop-by-hop information of the forward path. For example, the tail node uses a reverse link of a link in the forward path as a link in the return path. Alternatively, the tail node uses network topology information and the hop-by-hop information of the forward path as input of a path algorithm, and obtains the return path through computation by using the path algorithm. It should be noted that, for an implementation in which the tail node determines the return path according to the hop-by-hop information of the forward path, refer to the related descriptions of determining the return path by the head node in the embodiment in FIG. 4. Details are not described herein again.

Optionally, the path computation request packet sent by the head node further carries a path identifier corresponding to the return path. If the path identifier is a BSID, the path identifier may be selected by the head node from a specified identifier set, or may be randomly generated by the head node. That is, the head node predetermines the path identifier corresponding to the return path to be computed by the tail node. In this way, after subsequently determining the return path, the tail node may not need to notify the head node of the return path and the corresponding path identifier. Certainly, the tail node may alternatively feed back a path computation response packet to the head node, and add the path identifier to the path computation response packet. After receiving the path computation response packet, the head node sets the path identifier to an available state.

Alternatively, the path identifier is a BSID. The path computation request packet sent by the head node does not carry a path identifier corresponding to the return path, and the path identifier is selected by the tail node from a specified identifier set, or is randomly generated by the tail node. The tail node subsequently feeds back a path computation response packet to the head node, and adds the path identifier to the path computation response packet. After receiving the path computation response packet, the head node sets the path identifier to an available state.

Optionally, the path computation request packet includes a second TLV, and the second TLV carries the hop-by-hop information of the forward path. Optionally, the second TLV further carries algorithm information. Optionally, the second TLV further carries a path identifier. The second TLV may be implemented by using an extended IGP protocol. This is not limited in this embodiment of this application.

Optionally, if the return path corresponds to a path identifier, the tail node generates a path binding relationship between hop-by-hop information of the return path and the path identifier. After determining the return path and the corresponding path identifier, the tail node feeds back a path computation response packet to the head node, where the path computation response packet carries the hop-by-hop information of the return path and the corresponding path identifier. In this way, the head node may subsequently encapsulate the hop-by-hop information of the return path into a first fault detection packet, and the tail node only needs to forward the first fault detection packet as the second fault detection packet. Alternatively, the path computation response packet carries the path identifier corresponding to the return path. Subsequently, if the head node encapsulates the path identifier into the first fault detection packet, the tail node determines the corresponding return path from the path binding relationship according to the path identifier, encapsulates the hop-by-hop information of the return path into the second fault detection packet, and sends the second fault detection packet according to the return path.

Step 1003: The head node sends the first fault detection packet to the tail node through the forward path, where the first fault detection packet indicates that the return path exists.

In this embodiment of this application, after the tail node determines the return path, the head node can send the first fault detection packet to the tail node through the forward path. For example, after the tail node sends the path computation response packet to the head node, the head node sends the first fault detection packet. When the tail node notifies the head node of the hop-by-hop information of the return path, the first fault detection packet carries the hop-by-hop information of the return path. When the tail node feeds back the path identifier corresponding to the return path to the head node, the first fault detection packet carries the path identifier corresponding to the return path. It should be noted that, for related descriptions of the first fault detection packet, refer to the embodiment in FIG. 4. Details are not described herein again.

Step 1004: The tail node receives the first fault detection packet.

In this embodiment of this application, after the head node sends the first fault detection packet to the tail node through the forward path, if the forward path is not faulty, the tail node receives the first fault detection packet. If the forward path is faulty, the tail node cannot receive the first fault detection packet.

Step 1005: The tail node sends the second fault detection packet through the return path, where the second fault detection packet is determined according to the first fault detection packet.

In this embodiment of this application, if the head node encapsulates the hop-by-hop information of the return path into the first fault detection packet, that is, if the first fault detection packet carries the hop-by-hop information of the return path, for example, a return path label stack is encapsulated into the first fault detection packet, the tail node only needs to forward the first fault detection packet as the second fault detection packet. Alternatively, if the head node encapsulates the path identifier into the first fault detection packet, the tail node determines the corresponding return path from the path binding relationship according to the path identifier, encapsulates the hop-by-hop information of the return path into the second fault detection packet, and sends the second fault detection packet according to the return path.

Step 1006: If the head node receives the second fault detection packet sent by the tail node through the return path, the head node determines that the forward path is not faulty.

Optionally, if the head node does not receive the second fault detection packet, the head node determines that the forward path is faulty.

It should be noted that, for an implementation of step 1006, refer to the related descriptions in step 406. Details are not described herein again.

In this embodiment of this application, if the head node determines that the forward path is faulty, the head node re-determines a forward path, or the control device re-determines a forward path and then delivers the forward path to the head node. Then, the head node resends a path computation request packet to the tail node, where the path computation request packet carries hop-by-hop information of the re-determined forward path. The tail node re-determines a return path according to the hop-by-hop information of the re-determined forward path. That is, the head node and/or the control device have/has a function of automatically updating the forward path, and the tail node automatically updates the return path accordingly.

In this embodiment of this application, the return path is determined according to the forward path. In a path fault detection process, the return path through which the fault detection packet fed back by the tail node to the head node passes includes the forward path. In this way, if the head node does not receive the fault detection packet fed back by the tail node, it indicates that the forward path is faulty. It can be learned that, in this solution, the return path covers the forward path, so that false detection can be avoided, thereby avoiding false switching caused by false detection, and mitigating impact on a communication service.

In addition, in this solution, manual configuration is not required. This improves fault detection efficiency, and can avoid a case in which a communication service is affected because manual configuration cannot be performed in time after a path fault occurs. In addition, the return path determined in this solution does not consider only a shortest path, but considers that the return path needs to include the forward path. That is, the return path in this solution is more appropriate.

Figure 11:
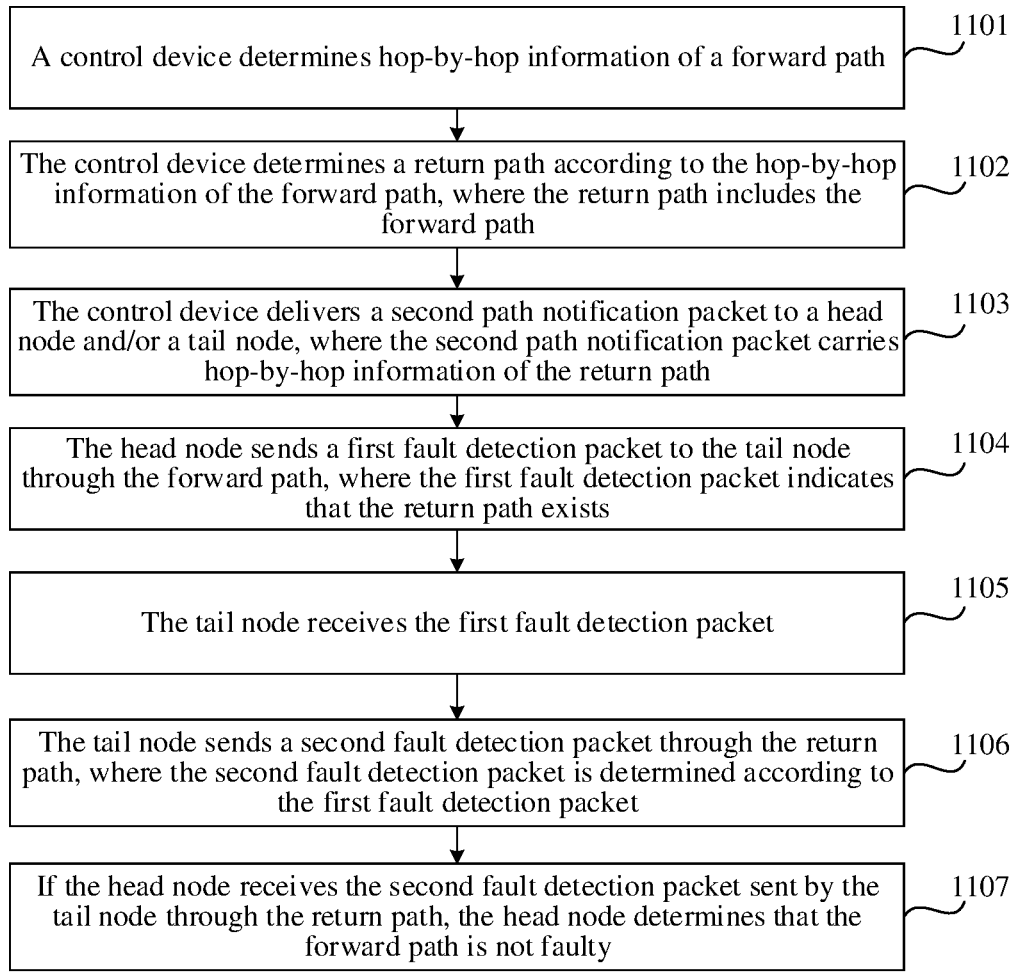
FIG. 11 is a flowchart of yet another path fault detection method according to an embodiment of this application.

FIG. 11 is a flowchart of yet another path fault detection method according to an embodiment of this application. In the embodiment shown in FIG. 11, that a control device determines a return path is used as an example for description. Refer to FIG. 11. The method includes the following steps.

Step 1101: The control device determines hop-by-hop information of a forward path.

In this embodiment of this application, because computation of the return path requires the hop-by-hop information of the forward path, the control device first determines the hop-by-hop information of the forward path.

In an implementation, before determining the hop-by-hop information of the forward path, the control device receives a path request packet sent by a head node or a tail node, where the path request packet carries path indication information. The control device determines the hop-by-hop information of the forward path from stored hop-by-hop information of one or more paths according to the path indication information carried in the path request packet.

Optionally, if a tunnel between the head node and the tail node includes one forward path, or includes one active forward path and one standby forward path, the path indication information may be indicated by a tunnel identifier of the tunnel, or may be indicated by a path identifier of the active forward path. If the tunnel includes a plurality of forward paths, or includes a plurality of active forward paths, the path indication information may be indicated by a path identifier of an active forward path for which an active return path currently needs to be determined.

It should be noted that, when the path indication information is indicated by a tunnel identifier of a tunnel, the control device stores a relationship between a tunnel and a path, for example, correspondingly stores a tunnel identifier of a first tunnel and the hop-by-hop information of the forward path. The forward path may be computed by the control device in a process of creating a tunnel between the head node and the tail node. In this way, after receiving the path request packet sent by the head node or the tail node, the control device can obtain the corresponding hop-by-hop information of the forward path from the stored relationship between a tunnel and a path according to the path indication information. The relationship between a tunnel and a path includes hop-by-hop information of one or more paths.

It can be learned that, in an implementation, the hop-by-hop information of the forward path is prestored in the control device. After receiving the path request packet sent by the head node or the tail node, the control device can obtain the corresponding hop-by-hop information of the forward path from the stored hop-by-hop information of the one or more paths according to the path indication information.

In another implementation, before determining the hop-by-hop information of the forward path, the control device receives a path request packet sent by a head node or a tail node, where the path request packet carries path indication information. The control device computes the forward path and the return path according to the path indication information carried in the path request packet, to obtain the hop-by-hop information of the forward path and hop-by-hop information of the return path. That is, the hop-by-hop information of the forward path is obtained by the control device through current path computation.

In still another implementation, before determining the hop-by-hop information of the forward path, the control device receives a path request packet sent by a head node, where the path request packet further carries the hop-by-hop information of the forward path. The control device parses the path request packet to obtain the hop-by-hop information of the forward path. Optionally, in this implementation, the forward path is computed by the head node.

Optionally, the path indication information includes a request number, and the request number uniquely identifies a path, that is, identifies the forward path. Optionally, when the path indication information is indicated by a tunnel identifier of a tunnel, the request number uniquely identifies the tunnel.

For example, that the head node requests the control device to compute a path is used as an example. The control device is a path computation element protocol (path computation element protocol, PCEP)-based PCE device, and the head node is a policy control and charging (policy control and charging, PCC) device. The head node uses a BFD path computation request message as a path request packet, and defines Object-Class (Object-Class), Object-Type (Object-Type), and Object Body (Object Body) in the path computation request message (PCReq), to generate the path request packet. According to this definition, the path request packet includes a path computation request object, the path computation request object carries path indication information, and the path indication information includes a request number.

Table 3 shows a structure of a path computation request object according to an embodiment of this application. The path computation request object includes fields such as Object-Class, Object-Type, and Object Body. Table 4 shows a structure of Object Body of the path computation request object in Table 3.

TABLE 3

| Object-Class | Object-Type | | | | |
|---|---|---|---|---|---|
| 2 | 2 | Res | P | I | Object-Length |
| Object Body | | | | | |

TABLE 4

| Flags (Priority, BFD Type, and the like) |
|---|
| Request-ID-Number |
| Optional |

In this embodiment of this application, (Object-Class, Object-Type)=(2, 2) is defined in the path computation request object, and Object Body includes Flags, Request-ID-Number, and Optional (optionally extended fields). Optionally, Flags include flag bits such as Priority and BFD Type. Object-Class and Object-Type indicate that the object carried in the path request packet is a path computation request object. Request-ID-Number is a request number, and the request number may uniquely identify a path. Optionally, Request-ID-Number, an address of PCC (head node), and an address of PCE (control device) uniquely identify a path computation request, and the addresses of PCC and PCE may be carried in a packet header of the path request packet. In this example, (Object-Class, Object-Type)=(2, 2) is a field defined in a standard protocol. Therefore, in this solution, a flag bit such as BFD Type in Flags is defined to indicate that the path request packet is used only for a BFD packet, but is not used for service forwarding.

Optionally, the path request packet further carries algorithm information, and the algorithm information indicates the control device to determine the return path according to a specified algorithm. For example, the algorithm information is carried in the path computation request object. For example, an extended field in Optional is used to carry the algorithm information. Alternatively, the path request packet further carries a source-destination node object, and the source-destination node object carries algorithm information. Optionally, the source-destination node object further carries a tunnel source address and a tunnel destination address, and the tunnel source address and the tunnel destination address are used by a control node to compute the return path. It should be noted that, if the path request packet does not carry algorithm information, the control device determines the return path according to a default algorithm.

Table 5 shows a structure of a source-destination node object according to an embodiment of this application. The source-destination node object includes fields such as Object-Class, Object-Type, and Object Body. Table 6 shows a structure of Object Body of the source-destination node object in Table 5.

TABLE 5

| Object-Class | Object-Type | | | | |
|---|---|---|---|---|---|
| 4 | 3 or 4 | Res | P | I | Object-Length |
| Object Body | | | | | |

TABLE 6

| Tunnel Source IP address |
|---|
| Tunnel Destination IP address |
| Algorithm |

In this embodiment of this application, (Object-Class, Object-Type)=(4, 3, or 4) is defined in the source-destination node object, and Object Body includes Tunnel Source IP address, Tunnel Destination IP address, and Algorithm. (Object-Class, Object-Type)=(4, 3) is used for a tunnel whose source and destination are IPv4, (Object-Class, Object-Type)=(4, 4) is used for a tunnel whose source and destination are IPv6, Tunnel Source IP address is a tunnel source address, Tunnel Destination IP address is a tunnel destination address, and Algorithm is algorithm information. If Algorithm is empty, the control device uses a default algorithm for path computation.

That the path request packet is obtained by extending the BFD path computation request message is used above as an example for description. In this way, if this solution is implemented according to a standard protocol, the protocol is not greatly changed, network devices such as the head node and the tail node are slightly affected, and compatibility is strong. In some other embodiments, a new communication protocol may be defined, or another protocol packet may be extended to obtain the path request packet. This is not limited in this embodiment of this application.

Step 1102: The control device determines the return path according to the hop-by-hop information of the forward path, where the return path includes the forward path.

In this embodiment of this application, after determining the hop-by-hop information of the forward path, the control device determines the return path according to the hop-by-hop information of the forward path. The determined return path includes the forward path. For example, the control device uses a reverse link of a link in the forward path as a link in the return path. Alternatively, the control device uses network topology information and the hop-by-hop information of the forward path as input of a path algorithm, and obtains the return path through computation by using the path algorithm. It should be noted that, for an implementation in which the control device determines the return path according to the hop-by-hop information of the forward path, refer to the related descriptions of determining the return path by the head node in the embodiment in FIG. 4. Details are not described herein again.

Step 1103: The control device delivers a second path notification packet to the head node and/or the tail node, where the second path notification packet carries the hop-by-hop information of the return path.

In this embodiment of this application, after determining the return path, the control device delivers the second path notification packet to the head node and/or the tail node, where the second path notification packet carries the hop-by-hop information of the return path. After the control device delivers a third path notification packet, a fault detection packet can be sent between the head node and the tail node according to the forward path and the return path, so as to perform fault detection on the forward path.

Optionally, the second path notification packet includes an explicit path object, and the explicit path object carries the hop-by-hop information of the return path.

For example, the second path notification packet is obtained by extending a BFD path computation response message (PCReq), and Object-Class, Object-Type, and Object Body of the explicit path object are defined in the path computation response message, to generate the second path notification packet.

Table 7 shows a structure of an explicit path object according to an embodiment of this application. The explicit path object includes fields such as Object-Class, Object-Type, and Object Body. Table 8 shows a structure of Object Body of the explicit path object in Table 7.

TABLE 7

| Object-Class | Object-Type | | | | |
|---|---|---|---|---|---|
| 7 | 2 | Res | P | I | Object-Length |
| Object Body | | | | | |

TABLE 8

| L, Type, and Length |
|---|
| link sid 1 |
| link sid 2 |
| . . . |
| link sid n |
| Optional |

In this embodiment of this application, (Object-Class, Object-Type)=(7, 2) is defined in the explicit path object, which indicates that the object is an object that carries hop-by-hop information. Object Body includes a flag bit including L, Type, and Length, and the flag bit indicates that a field whose length is Length after the flag bit carries the hop-by-hop information of the return path, that is, a link sid 1, a link sid 2, . . . , and a link sid n are the hop-by-hop information of the return path.

It can be learned from the foregoing descriptions that there is a case in which the control device computes both the forward path and the return path. In this case, the control device may add both the hop-by-hop information of the forward path and the hop-by-hop information of the return path to the second path notification packet. For example, the flag bit including L, Type, and Length and the corresponding hop-by-hop information of the forward path are added to Object Body of the explicit path object shown in Table 8. The added flag bit indicates that the field whose length is Length after the flag bit carries the hop-by-hop information of the forward path. The control device delivers the hop-by-hop information of the forward path to the head node, and delivers the hop-by-hop information of the return path to the head node and/or the tail node. If the control device also delivers the forward path to the tail node, the tail node may not perform processing.

That the third path notification packet is obtained by extending the BFD path computation response message is used above as an example for description. In this way, if this solution is implemented according to a standard protocol, the protocol is not greatly changed, network devices such as the head node and the tail node are slightly affected, and compatibility is strong. In some other embodiments, a new communication protocol may be defined, or another protocol packet may be extended to obtain the second path notification packet. This is not limited in this embodiment of this application.

Optionally, the second path notification packet further carries a path identifier corresponding to the return path. The path identifier is selected by the control device from a specified identifier set, or is randomly generated by the control device.

Step 1104: The head node sends a first fault detection packet to the tail node through the forward path, where the first fault detection packet indicates that the return path exists.

In this embodiment of this application, if the control device delivers the second path notification packet (as shown in FIG. 6) to the head node, and the second path notification packet carries the hop-by-hop information of the return path, the head node encapsulates the hop-by-hop information of the return path into the first fault detection packet, and sends the first fault detection packet to the tail node. For example, the head node encapsulates a forward path label stack and a return path label stack into the first fault detection packet.

If the control device delivers the second path notification packet to the tail node, the second path notification packet carries the hop-by-hop information of the return path and a corresponding path identifier, and the control device delivers the path identifier corresponding to the return path to the head node through the third path notification packet, the first fault detection packet sent by the head node does not carry the hop-by-hop information of the return path, but carries the path identifier of the return path.

If the control device delivers the second path notification packet to both the head node and the tail node, and the second path notification packet carries the hop-by-hop information of the return path and a corresponding path identifier, any one of the foregoing implementations may be used between the head node and the tail node to implement fault detection on the forward path according to the fault detection packet. For a specific implementation, refer to the related descriptions in the embodiment in FIG. 4. Details are not described herein again.

Optionally, after the control device delivers the hop-by-hop information of the return path to the head node, the head node may notify the tail node of the hop-by-hop information of the return path.

Step 1105: The tail node receives the first fault detection packet.

It should be noted that, after the head node sends the first fault detection packet, if the forward path is not faulty, the tail node can receive the first fault detection packet. If the forward path is faulty, the tail node cannot receive the first fault detection packet.

Step 1106: The tail node sends a second fault detection packet through the return path, where the second fault detection packet is determined according to the first fault detection packet.

When the hop-by-hop information of the return path is encapsulated into the first fault detection packet, the tail node only needs to forward the first fault detection packet according to the return path after receiving the first fault detection packet, that is, the tail node uses the first fault detection packet as the second fault detection packet, and forwards the second fault detection packet according to the return path. For a specific implementation, refer to the related descriptions in the embodiment in FIG. 4. Details are not described herein again. It should be noted that, in this case, the second path notification packet does not need to carry the path identifier corresponding to the return path. In addition, function dependency on the tail node is low, and the tail node only needs to have a basic SR function.

When the first fault detection packet does not carry the hop-by-hop information of the return path, but carries the path identifier of the return path, after receiving the first fault detection packet, the tail node determines, from a stored path binding relationship, the hop-by-hop information of the return path that corresponds to the path identifier. The tail node generates the second fault detection packet into which the hop-by-hop information of the return path is encapsulated, and sends the second fault detection packet to the head node according to the return path. For a specific implementation, refer to the related descriptions in the embodiment in FIG. 4. Details are not described herein again.

Step 1107: If the head node receives the second fault detection packet sent by the tail node through the return path, the head node determines that the forward path is not faulty.

Optionally, if the head node does not receive the second fault detection packet, the head node determines that the forward path is faulty.

It should be noted that, for an implementation of step 1107, refer to the related descriptions in step 406. Details are not described herein again.

Optionally, in this embodiment of this application, if the head node subsequently detects that the forward path is faulty, the head node re-requests the control device to compute a forward path and a return path. Alternatively, after re-determining a forward path, the head node requests the control device to compute a corresponding return path. For a specific implementation, refer to the related content in the foregoing embodiment. Details are not described herein again.

In conclusion, in this embodiment of this application, the control device determines the return path according to the forward path, so as to reduce computing pressure of the head node and the tail node, and reduce function dependency on the head node and the tail node. In a subsequent path fault detection process, the return path through which the fault detection packet fed back by the tail node to the head node passes includes the forward path. In this way, if the head node receives the fault detection packet fed back by the tail node, it indicates that the forward path is not faulty. It can be learned that, in this solution, the return path covers the forward path, so that false detection can be avoided, thereby avoiding false switching caused by false detection, and mitigating impact on a communication service. That is, the return path in this solution is more appropriate. In addition, in this solution, manual configuration is not required. This improves fault detection efficiency, and can avoid a case in which a communication service is affected because manual configuration cannot be performed in time after a path fault occurs.

FIG. 12 is a schematic diagram of a structure of a path fault detection apparatus 1200 according to an embodiment of this application. Optionally, the path fault detection apparatus 1200 may be implemented as a part or all of a communication device by using software, hardware, or a combination thereof. The communication device may be the head node shown in FIG. 1 or FIG. 2, that is, the apparatus 1200 is used for the head node. Refer to FIG. 12. The apparatus 1200 includes a first sending module 1201 and a first determining module 1202.

The first sending module 1201 is configured to send a first fault detection packet to a tail node through a forward path, where the first fault detection packet indicates that a return path exists, the return path includes the forward path, and the return path is determined according to the forward path.

The first determining module 1202 is configured to: if a second fault detection packet sent by the tail node through the return path is received, determine that the forward path is not faulty, where the second fault detection packet is determined according to the first fault detection packet. For a specific implementation, refer to the related descriptions in step 403 to step 406 in the embodiment in FIG. 4. Details are not described herein again.

Optionally, the apparatus 1200 further includes:
a second determining module, configured to: if the second fault detection packet is not received, determine that the forward path is faulty.

Optionally, the apparatus 1200 further includes:
a third determining module, configured to determine the return path according to hop-by-hop information of the forward path. For a specific implementation, refer to the related descriptions in step 401 in the embodiment in FIG. 4. Details are not described herein again.

Optionally, the hop-by-hop information includes link information and/or node information. For a specific implementation, refer to the related descriptions in step 401 in the embodiment in FIG. 4. Details are not described herein again.

Optionally, the apparatus 1200 further includes:
a second sending module, configured to send a first path notification packet to the tail node, where the first path notification packet carries hop-by-hop information of the return path. For a specific implementation, refer to the related descriptions in step 402 in the embodiment in FIG. 4. Details are not described herein again.

Optionally, the first path notification packet is used by the tail node to generate a path binding relationship between the hop-by-hop information of the return path and a path identifier.

Optionally, the apparatus 1200 further includes:
a receiving module, configured to receive a first response packet sent by the tail node, where the first response packet carries the path identifier; and
the apparatus 1200 further includes:
a first generation module, configured to: generate the first fault detection packet, where the first fault detection packet carries the path identifier, and the first fault detection packet indicates the tail node to determine, from the path binding relationship, the hop-by-hop information of the return path that corresponds to the path identifier; and generate the second fault detection packet in which the hop-by-hop information of the return path is encapsulated.

For a specific implementation, refer to the related descriptions in step 402 and step 403 in the embodiment in FIG. 4. Details are not described herein again.

Optionally, the path identifier is a binding segment identifier BSID.

Optionally, the apparatus 1200 further includes:
a second generation module, configured to generate the first fault detection packet, where the first fault detection packet carries hop-by-hop information of the return path, and the first fault detection packet indicates the tail node to use the first fault detection packet as the second fault detection packet, and forward the second fault detection packet according to the return path. For a specific implementation, refer to the related descriptions in the embodiment in FIG. 9. Details are not described herein again.

Optionally, the forward path includes a plurality of load sharing paths, any load sharing path is used to bear a part or all of a load between the head node and the tail node, and the return path includes the plurality of load sharing paths. For a specific implementation, refer to the related descriptions in step 401 in the embodiment in FIG. 4. Details are not described herein again.

Optionally, the return path meets a specified condition, and the specified condition includes one or more of a lowest cost, a maximum bandwidth, and a minimum hop count. For a specific implementation, refer to the related descriptions in step 401 in the embodiment in FIG. 4. Details are not described herein again.

Optionally, the apparatus 1200 further includes:
a first updating module, configured to re-determine a forward path; and
a second updating module, configured to update the return path according to the re-determined forward path. For a specific implementation, refer to the related descriptions in the embodiments in FIG. 4 and FIG. 9. Details are not described herein again.

Optionally, a link in the return path is consistent with a link in the forward path. For a specific implementation, refer to the related descriptions in the embodiment in FIG. 4. Details are not described herein again.

In this embodiment of this application, the return path is determined according to the forward path. In a link fault detection process, the return path through which the fault detection packet fed back by the tail node to the head node passes includes the forward path. In this way, if the head node receives the fault detection packet fed back by the tail node, it indicates that the forward path is not faulty. It can be learned that, in this solution, the return path covers the forward path, so that false detection can be avoided, thereby avoiding false switching caused by false detection, and mitigating impact on a communication service.

It should be noted that, when the path fault detection apparatus provided in the foregoing embodiment detects a link fault, division into the foregoing functional modules is merely used as an example for description. During actual application, the foregoing functions may be allocated to different functional modules for implementation according to a requirement. That is, an internal structure of the apparatus is divided into different functional modules to implement all or some of the functions described above. In addition, the path fault detection apparatus provided in the foregoing embodiment and the embodiment of the path fault detection method belong to a same concept. For a specific implementation process of the path fault detection apparatus provided in the foregoing embodiment, refer to the method embodiment. Details are not described herein again.

FIG. 13 is a schematic diagram of a structure of another path fault detection apparatus 1300 according to an embodiment of this application. Optionally, the path fault detection apparatus 1300 may be implemented as a part or all of a communication device by using software, hardware, or a combination thereof. The communication device may be the tail node shown in FIG. 1 or FIG. 2, that is, the apparatus 1300 is used for the tail node. Refer to FIG. 13. The apparatus 1300 includes a first receiving module 1301 and a sending module 1302.

The first receiving module 1301 is configured to receive a first fault detection packet sent by a head node through a forward path, where the first fault detection packet indicates that a return path exists, the return path includes the forward path, and the return path is determined according to the forward path.

The sending module 1302 is configured to send a second fault detection packet through the return path, where the second fault detection packet is determined according to the first fault detection packet. For a specific implementation, refer to the detailed descriptions in step 1003 to step 1007 in the embodiment in FIG. 10. Details are not described herein again.

Optionally, the return path corresponds to a path identifier, the tail node stores a path binding relationship between hop-by-hop information of the return path and the path identifier, and the first fault detection packet carries the path identifier; and the apparatus 1300 further includes:
a first determining module, configured to determine, from the path binding relationship, the hop-by-hop information of the return path that corresponds to the path identifier carried in the first fault detection packet; and
a generation module, configured to generate the second fault detection packet, where the second fault detection packet carries the hop-by-hop information of the return path. For a specific implementation, refer to the detailed descriptions in step 1005 in the embodiment in FIG. 10. Details are not described herein again.

Optionally, the first fault detection packet carries hop-by-hop information of the return path; and
the sending module 1302 includes:
a forwarding submodule, configured to: use the first fault detection packet as the second fault detection packet, and forward the second fault detection packet according to the return path. For a specific implementation, refer to the detailed descriptions in step 1005 in the embodiment in FIG. 10. Details are not described herein again.

Optionally, the apparatus 1300 further includes:
a second receiving module, configured to receive a path computation request packet sent by the head node, where the path computation request packet carries hop-by-hop information of the forward path; and
a second determining module, configured to determine the return path according to the hop-by-hop information of the forward path. For a specific implementation, refer to the detailed descriptions in step 1002 in the embodiment in FIG. 10. Details are not described herein again.
path. In a link fault detection process, the return path through which the fault detection packet fed back by the tail node to the head node passes includes the forward path. In this way, if the head node receives the fault detection packet fed back by the tail node, it indicates that the forward path is not faulty. It can be learned that, in this solution, the return path covers the forward path, so that false detection can be avoided, thereby avoiding false switching caused by false detection, and mitigating impact on a communication service.

It should be noted that, when the path fault detection apparatus provided in the foregoing embodiment detects a link fault, division into the foregoing functional modules is merely used as an example for description. During actual application, the foregoing functions may be allocated to different functional modules for implementation according to a requirement. That is, an internal structure of the apparatus is divided into different functional modules to implement all or some of the functions described above. In addition, the path fault detection apparatus provided in the foregoing embodiment and the embodiment of the path fault detection method belong to a same concept. For a specific implementation process of the path fault detection apparatus provided in the foregoing embodiment, refer to the method embodiment. Details are not described herein again.

FIG. 14 is a schematic diagram of a structure of still another path fault detection apparatus 1400 according to an embodiment of this application. Optionally, the path fault detection apparatus 1400 may be implemented as a part or all of a communication device by using software, hardware, or a combination thereof. The communication device may be the control device shown in FIG. 2, that is, the apparatus 1400 is used for the control device. Refer to FIG. 14. The apparatus 1400 includes a first determining module 1401, a second determining module 1402, and a sending module 1403.

The first determining module 1401 is configured to determine hop-by-hop information of a forward path.

The second determining module 1402 is configured to determine a return path according to the hop-by-hop information of the forward path, where the return path includes the forward path.

The sending module 1403 is configured to deliver a second path notification packet to a head node and/or a tail node, where the second path notification packet carries hop-by-hop information of the return path. For a specific implementation, refer to the detailed descriptions in step 1101 to step 1103 in the embodiment in FIG. 11. Details are not described herein again.

Optionally, the apparatus 1400 further includes:
a receiving module, configured to receive a path request packet sent by the head node or the tail node, where the path request packet carries path indication information; and
the first determining module 1401 includes:
a determining submodule, configured to determine the hop-by-hop information of the forward path from stored hop-by-hop information of one or more paths according to the path indication information carried in the path request packet. For a specific implementation, refer to the detailed descriptions in the embodiment in FIG. 11. Details are not described herein again.

Optionally, the path indication information includes a request number, and the request number uniquely identifies a path.

Optionally, the path request packet further carries algorithm information, and the algorithm information indicates the control device to determine the return path according to a specified algorithm.

In this embodiment of this application, the control device determines the return path according to the forward path, so as to reduce computing pressure of the head node and the tail node, and reduce function dependency on the head node and the tail node. In a subsequent link fault detection process, the return path through which the fault detection packet fed back by the tail node to the head node passes includes the forward path. In this way, if the head node does not receive the fault detection packet fed back by the tail node, it indicates that the forward path is not faulty. It can be learned that, in this solution, false detection is reduced, thereby reducing a case of false switching caused by false detection, and mitigating impact on a communication service. That is, the return path in this solution is more appropriate. In addition, in this solution, manual configuration is not required. This improves fault detection efficiency, and can avoid a case in which a communication service is affected because manual configuration cannot be performed in time after a link fault occurs.

It should be noted that, when the path fault detection apparatus provided in the foregoing embodiment detects a link fault, division into the foregoing functional modules is merely used as an example for description. During actual application, the foregoing functions may be allocated to different functional modules for implementation according to a requirement. That is, an internal structure of the apparatus is divided into different functional modules to implement all or some of the functions described above. In addition, the path fault detection apparatus provided in the foregoing embodiment and the embodiment of the path fault detection method belong to a same concept. For a specific implementation process of the path fault detection apparatus provided in the foregoing embodiment, refer to the method embodiment. Details are not described herein again.

All or some of the foregoing embodiments may be implemented by software, hardware, firmware, or any combination thereof. When software is used to implement the foregoing embodiments, all or some of the foregoing embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like. It should be noted that the computer-readable storage medium mentioned in embodiments of this application may be a non-volatile storage medium, that is, may be a non-transitory storage medium.

It should be understood that "at least one" mentioned in this specification refers to one or more, and "a plurality of" refers to two or more. In the descriptions of embodiments of this application, unless otherwise specified, "/" means "or".

For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The foregoing descriptions are embodiments provided in this application, but are not intended to limit this application. Any modification, equivalent replacement, or improvement made without departing from the spirit and principle of this application should fall within the protection scope of this application.

What is claimed is:

1. A network device, comprising:
   one or more memories configured to store instructions; and
   one or more processors coupled to the one or more memories and configured to execute the instructions to cause the network device to:
   send a first fault detection packet to a tail node through a forward path, wherein the first fault detection packet indicates that a return path exists, the return path comprises the forward path, and the return path is determined according to the forward path;
   send a first path notification packet to the tail node, wherein the first path notification packet carries hop-by-hop information of the return path, wherein the first path notification packet is used by the tail node to generate a path binding relationship between the hop-by-hop information of the return path and a path identifier, wherein the tail node determines the return path based at least in part on the path binding relationship; and
   when a second fault detection packet sent by the tail node through the return path is received, determine that the forward path is not faulty, wherein the second fault detection packet is determined according to the first fault detection packet.

2. The network device according to claim 1, wherein the one or more processors are further configured to execute the instructions to cause the network device to:
   when the second fault detection packet is not received, determine that the forward path is faulty.

3. The network device according to claim 2, wherein the one or more processors are further configured to execute the instructions to cause the network device to:
   re-determine a new forward path; and
   update the return path according to the re-determined new forward path.

4. The network device according to claim 1, wherein the one or more processors are further configured to execute the instructions to cause the network device to:
   determine the return path according to the hop-by-hop information of the forward path.

5. The network device according to claim 4, wherein the hop-by-hop information comprises link information or node information.

6. The network device according to claim 1, wherein the one or more processors are further configured to execute the instructions to cause the network device to:
- receive a first response packet sent by the tail node, wherein the first response packet carries the path identifier; and
- generate the first fault detection packet, wherein the first fault detection packet carries the path identifier, and the first fault detection packet indicates to the tail node to determine, from the path binding relationship, the hop-by-hop information of the return path that corresponds to the path identifier, and to generate the second fault detection packet in which the hop-by-hop information of the return path is encapsulated.

7. The network device according to claim 1, wherein the path identifier is a binding segment identifier (BSID).

8. The network device according to claim 1, wherein the one or more processors are further configured to execute the instructions to cause the network device to:
- generate the first fault detection packet, wherein the first fault detection packet carries the hop-by-hop information of the return path, and the first fault detection packet indicates to the tail node to use the first fault detection packet as the second fault detection packet, and to forward the second fault detection packet according to the return path.

9. The network device according to claim 1, wherein the forward path comprises a plurality of load sharing paths, any load sharing path of the plurality of load sharing paths is used to bear at least a portion of a load between the network device and the tail node, and the return path comprises the plurality of load sharing paths.

10. The network device according to claim 1, wherein the return path meets a preset condition, and the preset condition comprises one or more of a lowest cost, a maximum bandwidth, and a minimum hop count.

11. The network device according to claim 1, wherein a return path link in the return path is consistent with a forward path link in the forward path.

12. A network device, comprising:
- one or more memories configured to store instructions; and
- one or more processors coupled to the one or more memories and configured to execute the instructions to cause the network device to:
  - receive a first fault detection packet sent by a head node through a forward path, wherein the first fault detection packet indicates that a return path exists, the return path comprises the forward path, and the return path is determined according to the forward path;
  - receive a first path notification packet, wherein the first path notification packet carries hop-by-hop information of the return path;
  - generate a path binding relationship between the hop-by-hop information of the return path and a path identifier;
  - determine the return path based at least in part on the path binding relationship; and
  - send a second fault detection packet through the return path, wherein the second fault detection packet is determined according to the first fault detection packet.

13. The network device according to claim 12, wherein the return path corresponds to the path identifier, the network device stores the path binding relationship between the hop-by-hop information of the return path and the path identifier, and the first fault detection packet carries the path identifier; and
- wherein the one or more processors are further configured to execute the instructions to cause the network device to:
  - determine, from the path binding relationship, the hop-by-hop information of the return path that corresponds to the path identifier carried in the first fault detection packet; and
  - generate the second fault detection packet, wherein the second fault detection packet carries the hop-by-hop information of the return path.

14. The network device according to claim 12, wherein the first fault detection packet carries the hop-by-hop information of the return path; and
- wherein the one or more processors are further configured to execute the instructions to cause the network device to:
  - use the first fault detection packet as the second fault detection packet, and forward the second fault detection packet according to the return path.

15. The network device according to claim 12, wherein the one or more processors are further configured to execute the instructions to cause the network device to:
- receive a path computation request packet sent by the head node, wherein the path computation request packet carries hop-by-hop information of the forward path; and
- determine the return path according to the hop-by-hop information of the forward path.

16. A network system comprising:
- a head node; and
- a tail node,
- wherein the head node is configured to:
  - send a first fault detection packet to the tail node through a forward path, wherein the first fault detection packet indicates that a return path exists, the return path comprises the forward path, and the return path is determined according to the forward path;
  - send a first path notification packet to the tail node, wherein the first path notification packet carries hop-by-hop information of the return path; and
  - when a second fault detection packet sent by the tail node through the return path is received, determine that the forward path is not faulty, wherein the second fault detection packet is determined according to the first fault detection packet; and
- wherein the tail node is configured to:
  - receive the first fault detection packet sent by the head node through the forward path;
  - generate, based on the first path notification packet, a path binding relationship between the hop-by-hop information of the return path and a path identifier;
  - determine the return path based at least in part on the path binding relationship; and
  - send the second fault detection packet through the return path.

17. The network system according to claim 16, wherein the head node is further configured to:
- when the second fault detection packet is not received by the head node, determine that the forward path is faulty.

18. The network system according to claim 16, wherein the head node is further configured to:
- determine the return path according to hop-by-hop information of the forward path.

19. The network system according to claim 16, wherein the return path meets a preset condition, and the preset condition comprises one or more of a lowest cost, a maximum bandwidth, and a minimum hop count.

20. The network system according to claim 16, wherein the hop-by-hop information comprises link information.

\* \* \* \* \*